(12) United States Patent
Danzig et al.

(10) Patent No.: US 7,342,587 B2
(45) Date of Patent: Mar. 11, 2008

(54) COMPUTER-IMPLEMENTED SYSTEM AND METHOD FOR HOME PAGE CUSTOMIZATION AND E-COMMERCE SUPPORT

(75) Inventors: Matt Danzig, Menlo Park, CA (US); Marcus Gosling, San Francisco, CA (US); Vernon Melvin Guymon, III, Menlo Park, CA (US); William David Harvey, Palo Alto, CA (US); Eric Nathan Ries, Palo Alto, CA (US)

(73) Assignee: IMVU, Inc., Palo Alto, CA (US)

( * ) Notice: Subject to any disclaimer, the term of this patent is extended or adjusted under 35 U.S.C. 154(b) by 0 days.

(21) Appl. No.: 11/242,360

(22) Filed: Sep. 30, 2005

(65) Prior Publication Data

US 2007/0002057 A1    Jan. 4, 2007

(51) Int. Cl.
*G06T 15/00* (2006.01)

(52) U.S. Cl. .................... 345/473; 715/753; 705/1; 705/26

(58) Field of Classification Search ........ 345/473–475; 715/753, 757, 758, 764; 705/1, 26, 27
See application file for complete search history.

(56) References Cited

U.S. PATENT DOCUMENTS

| | | | |
|---|---|---|---|
| 5,880,731 A | 3/1999 | Liles et al. | 715/758 |
| 5,956,038 A | 9/1999 | Rekimoto | 345/419 |
| 6,069,622 A | 5/2000 | Kurlander | 715/753 |
| 6,147,692 A | 11/2000 | Shaw et al. | 345/643 |
| 6,219,045 B1 | 4/2001 | Leahy et al. | 715/757 |
| 6,268,872 B1 | 7/2001 | Matsuda et al. | 345/473 |
| 6,307,568 B1 * | 10/2001 | Rom | 345/629 |
| 6,320,583 B1 | 11/2001 | Shaw et al. | 345/619 |
| 6,453,294 B1 | 9/2002 | Dutta et al. | 704/275 |
| 6,522,333 B1 | 2/2003 | Hatlelid et al. | 345/474 |
| 6,699,123 B2 | 3/2004 | Matsuura et al. | 463/31 |
| 6,784,901 B1 | 8/2004 | Harvey et al. | 715/757 |
| 7,006,098 B2 * | 2/2006 | Bickmore et al. | 345/474 |
| 7,065,711 B2 | 6/2006 | Hata et al. | 715/758 |
| 2004/0179037 A1 | 9/2004 | Blattner et al. | 715/751 |
| 2004/0179038 A1 | 9/2004 | Blattner et al. | 715/751 |
| 2004/0179039 A1 | 9/2004 | Blattner et al. | 715/758 |
| 2004/0221224 A1 | 11/2004 | Blattner et al. | 715/535 |
| 2005/0137015 A1 | 6/2005 | Rogers et al. | 463/42 |

OTHER PUBLICATIONS

Wallraven et al., Psychophysical Evaluation of Animated Facial Expressions, ACM, 9/2005, pp. 17-24, 186.*

* cited by examiner

*Primary Examiner*—Phu K. Nguyen
(74) *Attorney, Agent, or Firm*—Salter Intellectual Property Law

(57) ABSTRACT

A computer-implemented system and method for home page customization and e-commerce support is disclosed. The present invention relates to avatar home pages and the combination of a home page customization service with an e-commerce marketplace through which users can purchase home page decorations made by third party developers. Various embodiments include a "chat now" online matching system and a real-time map showing the geographical location of users in an online community.

38 Claims, 21 Drawing Sheets

The avatar picture and profile information of the owner of this home page - 1410-

Avatar pictures of other users who have visited this home page - 1412-

A message left by another user, with that user's avatar picture - 1414-

Avatar pictures of "friends." Clicking on a picture hyperlinks to that avatar's home page - 1416-

Gallery of other snapshots the owner of the home page has taken - 1418-

Body customization options for the avatar's eyes -1510-

Clothing customization option for the avatar's top -1512-

Clothing customization options for the avatar's bottom -1514-

3D avatars engaged in a dancing interaction -1612-

3D avatars in an interactive 3D Ferris wheel environment -1610-

Gift attached to message. This gift is a 3D environment depicting planes. The receiver of this gift can use this environment as the scene in which to chat with other avatars. -2010-

COMPUTER-IMPLEMENTED SYSTEM AND METHOD FOR HOME PAGE CUSTOMIZATION AND E-COMMERCE SUPPORT

BACKGROUND

1. Field

Embodiments of the invention relate to the field of computer network applications and networked communications; and more specifically, to the field of home page generation and e-commerce via a computer network.

2. Related Art

Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these systems do not represent the avatars as interacting in an environment.

U.S. Pat. No. 6,069,622 describes a comic generation system that controls the generation of comic panels. A comic panel is a graphical representation of an instance in time of a sequential course of events, such as a conversation between people. Each graphical representation typically includes a graphical representation of at least one character. The character has gestures that reflect a body pose and expressions that reflect a facial pose. Moreover, the character may have text associated with it (i.e., the character "speaks"), which is displayed in the comic panel within a bounded area called a "balloon." The comic generation system receives an interaction event and generates a comic panel. Examples of interaction events include text input by a user and selection of gestures and expressions by a user. When the interaction event provides text, the comic generation system automatically searches the text to identify any words or phrases that give rise to gestures and expressions for the character representing the user who provided the interaction event. Moreover, the comic generation system searches the text for trigger words that indicate alterations to the comic panel. The comic generation system generates the comic panel based on the results of its searches. The comic generation system also determines which characters to place in a comic panel, the positions of the characters, and the orientations of the characters. The comic generation system additionally determines the placement of balloons containing text.

However, the comic generation system described in the '622 patent is a static picture in a panel, as opposed to an animated character interacting with another avatar in the same scene. Given the static nature of the images in the '622 patent, the patent does not describe the use and interaction of avatars as 3-dimensional (3D) animated models. Further, although interaction events and user input can cause the modification of the character representing the user, the interaction events do not cause a character to transform into an entirely different character or object or cause the augmentation of the character into one with entirely new features.

U.S. Pat. No. 5,880,731 describes a system in which avatars representing participants in a graphic chat session are periodically animated to produce a gesture that conveys an emotion, action, or personality trait. Each participant in the chat session is enabled to select one of a plurality of different avatars to represent the participant in a graphic chat session. Associated with each avatar is a bitmap file that includes a plurality of frames illustrating the avatar in different poses, actions, and emotional states. Selected frames are displayed in rapid sequence in accord with a script file to create an animation effecting each gesture. The same script file is used to define a gesture for all of the avatars used in the chat session. A selected gesture can be transmitted with a text message to convey the user's emotional state. A gesture associated with the avatar is automatically displayed from time to time when the avatar is not otherwise gesturing or moving. The user can determine participants in the chat session with whom the user will interact, e.g., by defining a proximity radius around the user's avatar or by selecting the specific participants from a list. Avatars of participants that are outside the proximity radius (or otherwise not selected) and messages received from them are not displayed on the user's monitor.

The '731 patent specifically applies to avatars that are graphical bitmaps or sequences of bitmaps displayed according to a script. The '731 patent does not describe the use and interaction of avatars as 3-dimensional (3D) animated models. Further, although selected gestures can cause the modification of the character representing the user, the selected gestures do not cause a character to transform into an entirely different character or object or cause the augmentation of the character into one with entirely new features.

U.S. Pat. No. 6,522,333 describes a system and method for remote communication that allows communication over a network, but still provides a behavioral context within which the communication is interpreted. A visual representation of a user is provided to a recipient. A set of behavioral characteristics of the visual representation is provided to the user, the behavioral characteristics representing contexts within which data is to be interpreted. The user selects a behavioral characteristic and inputs data to be communicated to the recipient, along with any specific behavioral commands. Then, data is communicated to the recipient concurrently with a behavioral movement of the visual representation associated with the selected behavioral characteristic, wherein the behavioral movement provides context to the recipient for interpreting the communicated data. Behavioral characteristics include personality and mood intensity settings, and behavioral commands include gesture commands. The mood intensity selection allows the user to adjust which behavioral movements associated with the personality will be selected by assigning each movement a weight that determines the probability the movement will be selected. Gesture selection allows the user to punctuate text by having the visual representation act out a specific behavioral movement or sequence of movements to communicate an instantaneous emotion or behavior. Text is also analyzed to generate behavioral movements based on the content of the text.

Although user selected behavioral commands can cause the modification of the character representing the user, the selected behavioral commands do not cause a character to transform into an entirely different character or object or cause the augmentation of the character into one with entirely new features.

U.S. Pat. Nos. 6,320,583 and 6,147,692 describe methods and apparatuses to automate and confer additive properties to morphs (modification of a starting graphical image to a destination graphical image). The enhanced automated additive morphs created by this invention extend the currently limited scope of animation techniques, creating: moving morphs, where characters can speak, move, and emote during the morphing process; parametric character creation, where features can be sequentially added to a character to create a wide variety of resulting characters; behavioral transference, where character behavior can be automatically transferred to newly created characters, and behavioral layering whereby sequential behavior patterns can be concurrently transferred or imparted to a character. The patented inventions allow an animator to create, animate, control and transform two and three dimensional images instantaneously and fluidly. The invention provides a superior solution at significantly less cost which extends the range and properties of existing state of the art animation.

Again, although the technology described in the '583 and '692 patents can cause the modification of the character representing the user, the morphs and behavioral transference do not cause a character to transform into an entirely different character or object or cause the augmentation of the character into one with entirely new features. Further, the prior art systems do not provide an efficient means for communicating character and scene configurations and changes between IM users.

In the commercial marketplace of digital goods of today, wholesalers and retailers of digital goods still operate in the traditional model of physical goods. That is, wholesalers, intermediate wholesalers, and retailers still collaborate off-line to create digital goods, which are then offered for sale and/or download via the network. Unfortunately, there is currently no system or method by which users can deploy digital goods directly in a direct product offering or a derived product offering and use/display these products seamlessly in a three-dimensional (3D) IM environment.

Personal home pages have been an important part of the World Wide Web since it began in the early 90's. In the early days of the web, several of the first successful internet companies, such as Tripod and Geocities, were founded on the premise of providing free personal home pages that users could customize. Ten years later, the service of providing home pages that users can customize is still a large business. A recent example is the success of Myspace, which has more than 20 million users. All of the personal home page services, from the early ones to the most recent ones, have enabled users to express their identity by customizing their home pages and displaying personal information and pictures.

Although the creation and expression of an online identity are key drivers for personal home pages, some users want to maintain a degree of anonymity, or separation, between their real world identities and their online identities. The reasons are wide spread: some users are fearful that their pictures may be doctored and republished on the internet in an undesirable manner (such as compositing their heads on naked bodies to make apparent naked pictures); some users want to fashion a fantasy online identity that is different from their real world identity because they aren't limited by aspects of the real world identity such as their real world physical appearance for online activities such as chatting and playing games. For whatever their reason, many users want to create personal home pages to express an online identity without showing real world pictures. Prior art systems have been unable to effectively enable home page customization-in an anonymous yet user-friendly manner.

Thus, a computer-implemented system and method for home page customization and e-commerce support is needed.

BRIEF DESCRIPTION OF THE DRAWINGS

The present invention is illustrated by way of example and not limitation in the figures of the accompanying drawings, in which.

DETAILED DESCRIPTION

A computer-implemented system and method for home page customization and e-commerce support is disclosed. In the following description, numerous specific details are set forth. However, it is understood that embodiments of the invention may be practiced without these specific details. In other instances, well-known processes, structures and techniques have not been shown in detail in order not to obscure the understanding of this description.

The present invention relates to avatar home pages and the combination of a home page customization service with an e-commerce marketplace through which users can purchase home page decorations made by third party developers. Various embodiments include a "chat now" online matching system and a real-time map showing the geographical location of users in an online community.

Figure 1:
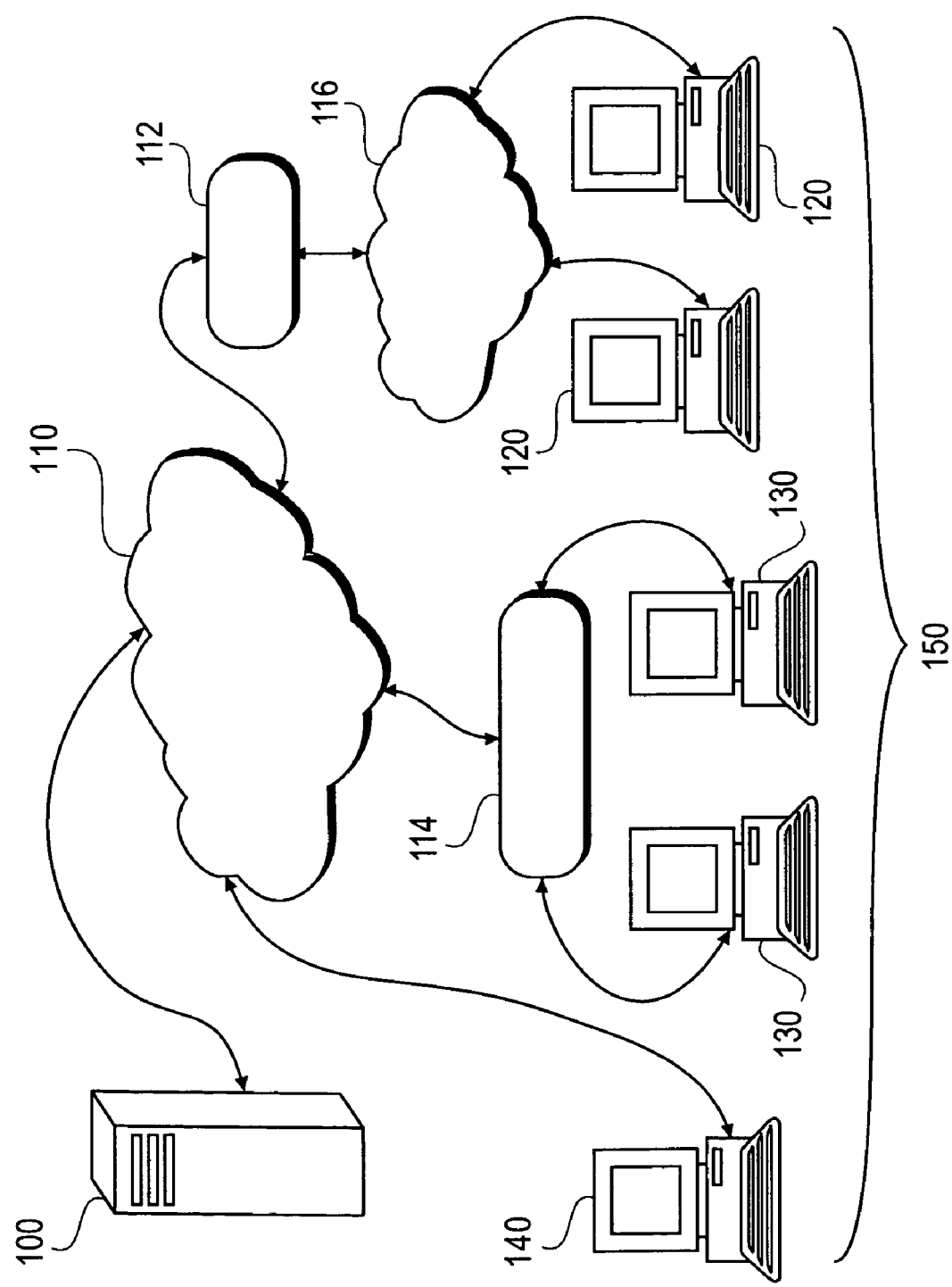
FIG. 1 is a block diagram of a network system on which the present invention may operate.

Referring now to FIG. 1, a diagram illustrates the network environment in which the present invention operates. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to, connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML translator of any other well-known supplier. Using such conventional browsers and the World-Wide Web, clients 150 may access image, graphical, and textual data provided by web server 100 or they may run Web application software. Conventional means exist by which clients 150 may supply information to web server 100 through the World-Wide Web 110 and the web server 100 may return processed data to clients 150.

Figure 2A:
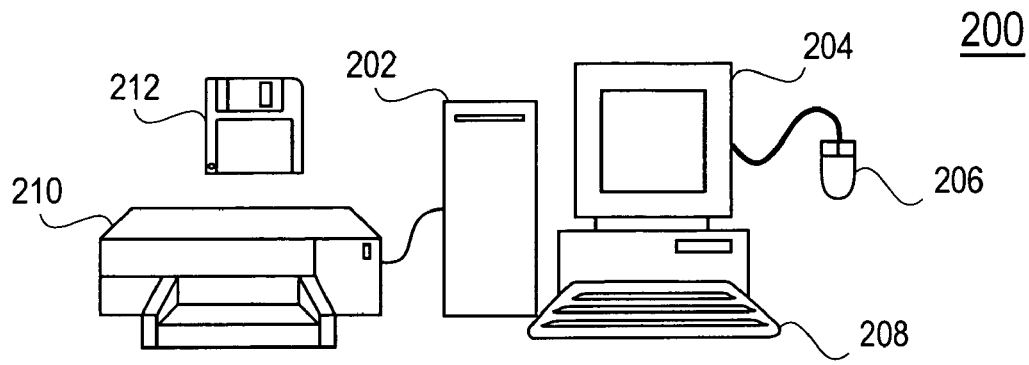
FIGS. 2a and 2b are a block diagram of a computer system on which the present invention may operate.
Figure 2B:
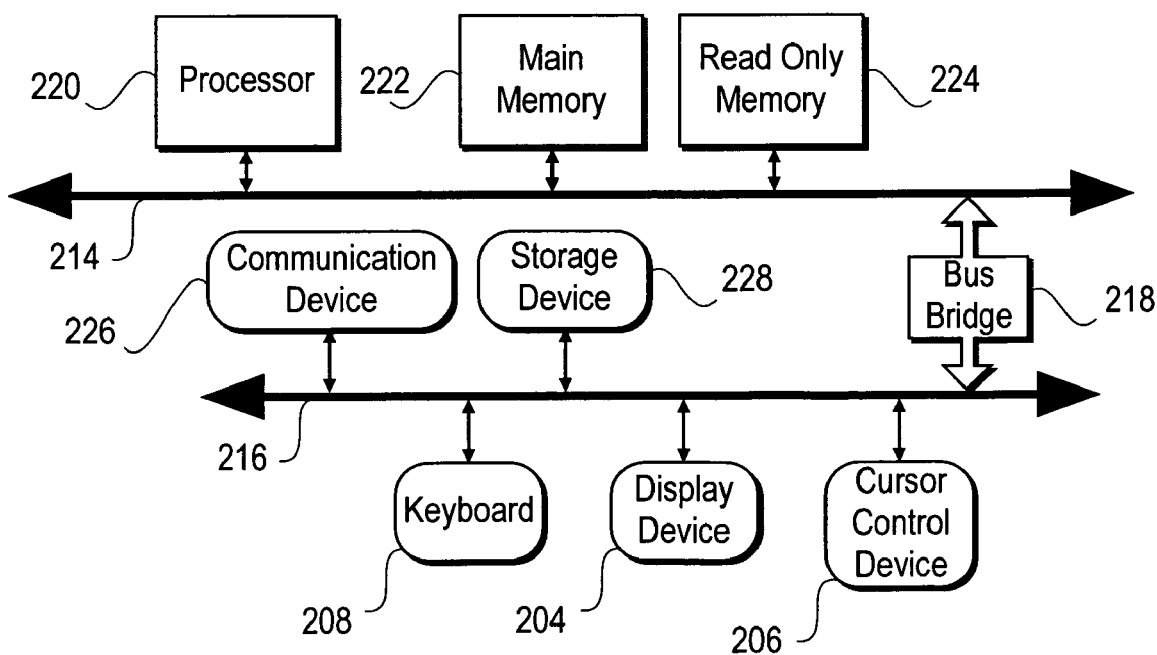

Having briefly described one embodiment of the network environment in which the present invention may operate, FIGS. 2a and 2b show an example of a computer system 200 illustrating an exemplary client 150 or server 100 computer system in which the features of the present invention may be implemented. Computer system 200 is comprised of a bus or other communications means 214,216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

The present invention is a computer-implemented system and method for home page customization and e-commerce support. In one embodiment, avatars represent one example of a digital product that can be self-defining, augmented, modified, improved, derived, or otherwise changed through a hierarchy of product developers, each of whom add some value to the component parts that are ultimately sold as a derived digital product.

The avatars of one embodiment of the present invention are built on conventional animated three-dimensional (3D) mathematical models using techniques well known to those of ordinary skill in the art. Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these systems do not represent the avatars as interacting in an environment.

Figure 3:
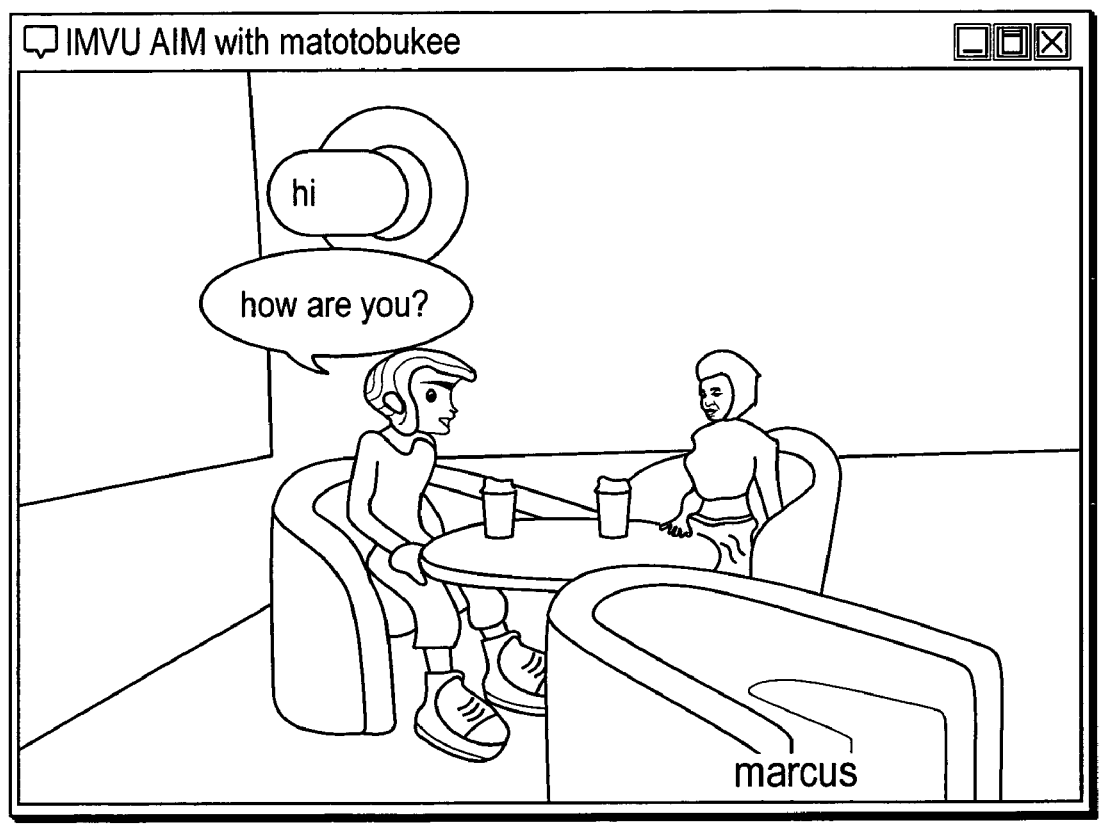
FIG. 3 illustrates an example of a shared virtual scene in which two avatars interact with each other as users represented by the avatars converse in an instant message communication environment.

The present invention improves on the prior art by placing these 3D avatars in virtual environments and enabling interaction between the avatars in a shared virtual scene. The behavior of the 3D avatars is related to the interaction between the computer users being represented by the avatars. In one embodiment, the avatars represent users in an instant messaging (IM) conversation supported by conventional network-based IM infrastructure. As the users type in dialog in a conventional IM application program, the dialog is displayed in the shared virtual scene as dialog bubbles adjacent to the avatar representing the speaker. FIG. 3 illustrates such a shared virtual scene in which two avatars are shown with associated dialog bubbles corresponding to the conversation taking place between IM users being represented by the avatars.

In the example of FIG. 3, each of the avatars in the virtual scene can represent a digital good or a digital product that can be offered for sale to a consumer. In particular, each avatar can represent a derived digital product that comprises a combination of component digital parts. For example, an avatar can include representations of various apparel and/or jewelry along with accessories. In the example of FIG. 3, one avatar is shown with a blue shirt and green shoes with a beverage cup on the table. This avatar can thus be considered a derived digital product with the blue shirt, the green shoes, and the beverage cup being digital component parts that can be purchased separately by a consumer. In this example, a consumer could be allowed to "dress" his/her avatar by purchasing component digital attire (i.e. digital component parts). The various available digital component parts can be provided by different digital wholesalers in a derived product hierarchy. In the description that follows, the system and method of the present invention to enable the authentication, versioning, downloading, and self-assembly of the digital products in an interactive 3D chat environment is fully disclosed.

Figure 4:
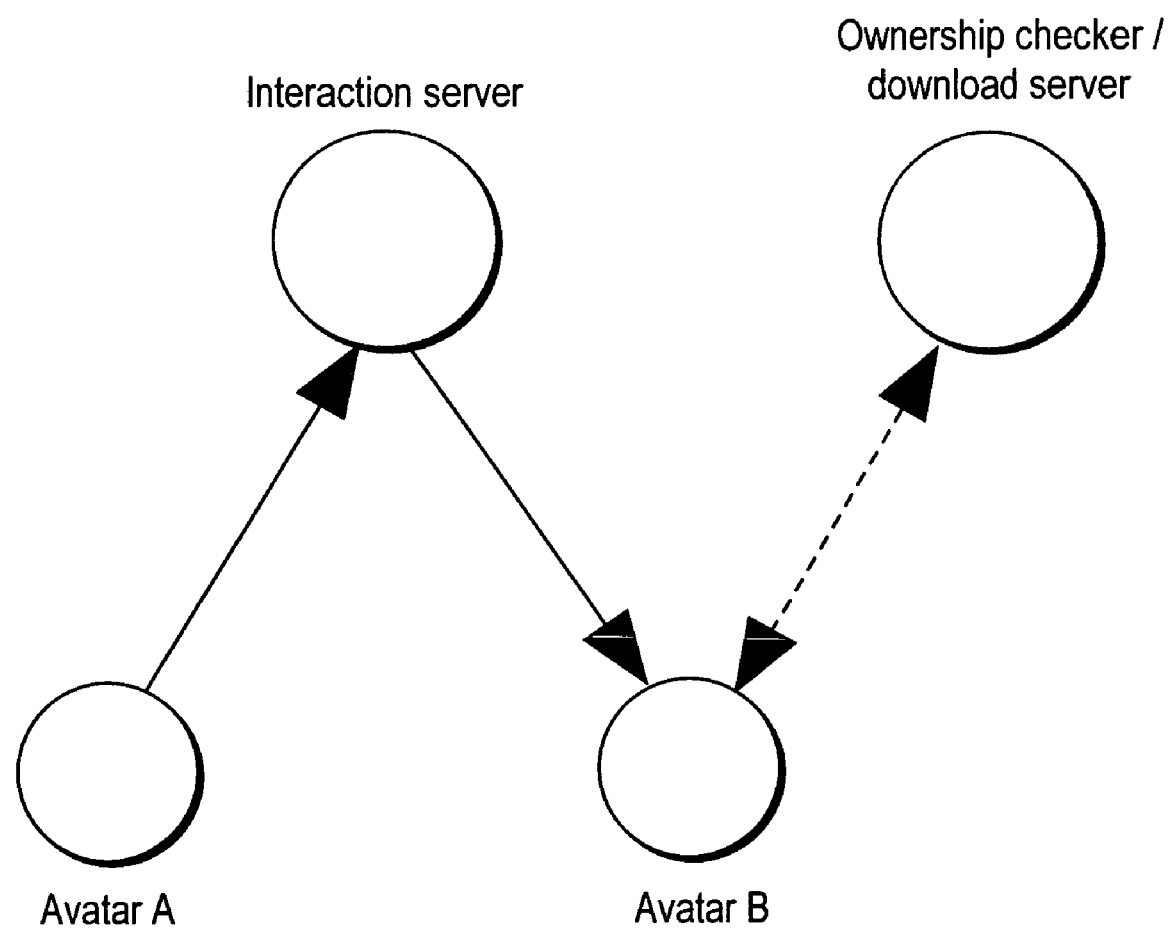
FIG. 4 illustrates a typical network architecture used in one embodiment.

Referring to FIG. 4, a diagram illustrates a typical network architecture used in one embodiment. In this embodiment, an interaction server is used to enable interaction and/or communication between two networked computer users represented by avatars (i.e. Avatar A and Avatar B). As described above, one application of the avatar embodiment of the present invention is an IM application. In the diagram of FIG. 4, the conventional IM server/provider is represented as the interaction server. In this case, the interaction server facilitates IM communications between the users associated with Avatar A and Avatar B.

Because the product model of the present invention relies upon the purchase and ownership of a particular avatar (i.e. digital product) by a particular user, it is necessary to determine at various stages of the IM communication whether a particular user is a legitimate owner (or licensee) of a selected avatar. For this reason, one embodiment uses the ownership checker server to validate that a specific user has acquired the rights to use a particular avatar or a particular digital product. If this ownership validation becomes necessary during an IM communication session, for example, the end user client system can initiate a communication with the ownership checker server to validate ownership of a particular digital product. If ownership is validated or a purchase transaction is completed, the ownership checker server enables the use of the particular digital product.

As an example of an ownership checking transaction, the user represented by Avatar B (shown in FIG. 4) may be in conventional IM communication with the user represented by Avatar A. During this IM session, Avatar B's user may wish to select or purchase a new pair of (digitally represented) shoes for his/her avatar (Avatar B). During this selection process, Avatar B's user is presented with various (digitally represented) shoe selections. Upon selection of a particular digital product (i.e. a digitally represented pair of shoes), the client system of Avatar B's user initiates a request to the ownership checker server to determine if Avatar B's user had previously purchased the selected digital product. If not, a purchase transaction may be initiated with the ownership checker server or another sales server in a different embodiment. Once the purchase transaction is complete, the ownership checker server validates Avatar B's user's property rights in the selected digital product and the selected (digitally represented) pair of shoes is displayed on Avatar B.

Figure 5:
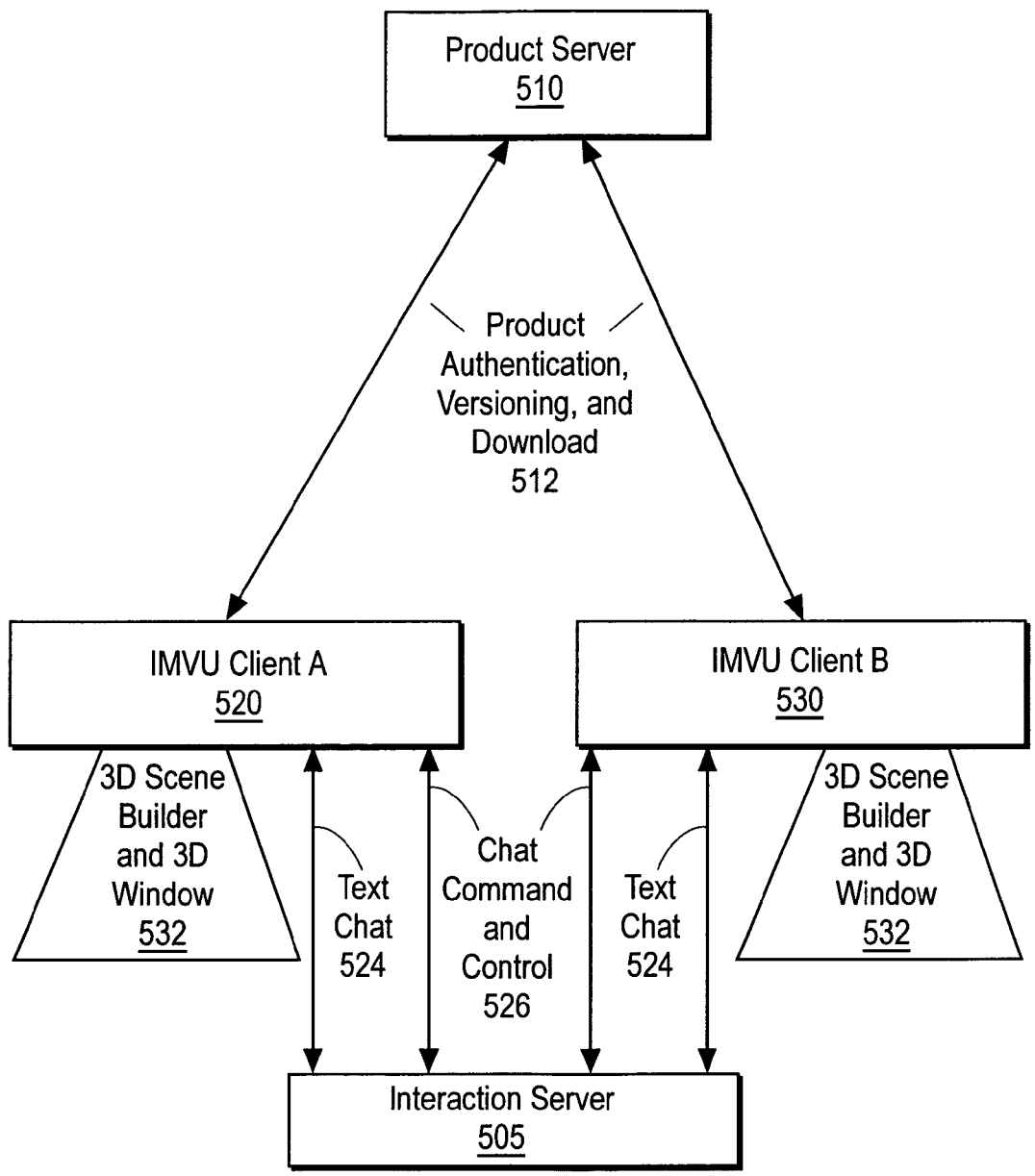
FIG. 5 illustrates a Communication Pathway Diagram.

Referring to FIG. 5, a diagram illustrates another embodiment of a network architecture used with the present invention. In this embodiment, an interaction server 505 is used to enable interaction and/or communication between two networked computer users represented by avatars (i.e. Avatar A and Avatar B) being generated on corresponding IM client computer system A 520 and corresponding IM client computer system B 530. As described above, one application of the avatar embodiment of the present invention is an IM application. In the diagram of FIG. 5, the conventional IM server/provider 505 (e.g. AIM) is represented as the interaction server communicating in well-known ways via text chat with clients 520 and 530 on communication channels 524. In this case, the interaction server 505 facilitates IM communications between the users associated with Avatar A (IM client computer system A 520) and Avatar B (IM client computer system B 530).

Although the present invention can employ the conventional text chat infrastructure of interaction server 505, the present invention augments the IM client software on client systems 520 and 530 to add a second logical channel for the transfer of chat command and control information 526 between interaction server 505 and client systems 520 and 530. The chat command and control channel 526 operates in parallel with first logical channel (i.e. conventional text chat) 524 to convey chat messages and chat control information between client 520 and client 530. In one embodiment, the second logical channel 526 can be implemented by inserting special predefined text characters into the text stream that would normally travel between clients 520 and 530. In the examples of the present invention illustrated below, an asterisk "*" symbol is used to signal the start of a chat command. It will be apparent to those of ordinary skill in the art upon reading this specification that other equivalent means can be used to implement a second logical channel or a side channel operating in parallel with a conventional text chat interaction server. In normal operation, clients 520 and 530 capture and interpret an incoming IM text stream. When necessary, as will be described in more detail below, the client 520 or 530 also may insert command and control text into the outgoing IM text stream thereby creating the second logical channel 526. In one embodiment, this control text is denoted with an asterisk (*) prefix. These are called 'star commands'.

Referring still to FIG. 5, because the product model of the present invention relies upon the purchase and ownership of a particular avatar (i.e. digital product) by a particular user, it is necessary to determine at various stages of the IM communication whether a particular user is a legitimate owner (or licensee) of a selected avatar. For this reason, one embodiment uses the product server 510 to validate that a specific user has acquired the rights to use a particular avatar (i.e. a particular digital product) or a portion thereof. If this ownership validation or authentication becomes necessary during an IM communication session, for example, the end user client system (e.g. IM client computer system A 520 or IM client computer system B 530) can initiate a communication with the product server 510 on communication channels 512 to validate ownership of a particular digital product. If ownership is validated or a purchase transaction is completed, the product server 510 enables the use of the particular digital product. In a similar fashion, the product server 510 can be used by IM client computer system A 520 or IM client computer system B 530 to validate that the most recent version of a desired digital product or a digital part is available. Once the authentication and versioning of a desired digital product or a digital part is completed, the IM client computer system A 520 or IM client computer system B 530 can initiate the download of the desired digital product or digital part. Conventional peer-to-peer networks can also be used to download digital goods thereby lightening the processing load on product server 510. Once the downloaded digital product or. digital part is resident in the client computer system, the resident digital product or digital part can be re-used by the client user until the license for the product expires or the product becomes out-dated by the presence of a more recent version of the product on product server 510. In some examples of the present invention presented below, the product server 510 may be denoted the IMVU server.

As an example of an ownership checking transaction, the user operating IM client computer system A 520 (represented by Avatar A) may be in conventional IM communication with the user operating IM client computer system B 530 (represented by Avatar B). During this IM session, Avatar B's user may wish to select or purchase a new pair of (digitally represented) shoes for his/her avatar (Avatar B). During this selection process, Avatar B's user is presented with various (digitally represented) shoe selections. Upon selection of a particular digital product (i.e. a digitally represented pair of shoes), the client system 530 of Avatar B's user initiates a request to the product server 510 to determine if Avatar B's user had previously purchased the selected digital product. If not, a purchase transaction may be initiated with the product server 510 or another sales server in a different embodiment. Once the purchase transaction is complete, the product server 510 validates Avatar B's user's property rights in the selected digital product and the selected (digitally represented) pair of shoes is displayed on Avatar B.

The avatars of the present invention are built on conventional animated three-dimensional (3D) mathematical models using well-known techniques. Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these prior art systems do not represent the avatars as interacting in a shared environment.

The present invention improves on the conventional technology by placing these 3D avatars in virtual environments and enabling interaction between the avatars in a shared virtual scene 532. The behavior of the 3D avatars is related to the interaction between the computer users being represented by the avatars. In one implementation, the avatars represent users in an instant messaging (IM) conversation supported by conventional network-based IM infrastructure. As the users type in dialog in a conventional IM application program, the dialog is rendered by a 3D scene builder (shown in FIG. 5) and displayed in the shared virtual scene (3D window) 532 as dialog bubbles adjacent to the avatar representing the speaker. The avatar positioning, and gesturing conveys an interaction between the virtual characters that corresponds to the interaction between the physical users.

The 3D scene builder and 3D window 532 of one embodiment integrates visual effects, product files and text chat into a coherent 3D scene. Except for the 2D graphical user interface (GUI) and overlays, the 3D scene is entirely composed of digital product patterns (i.e. Body Patterns) and their component digital product parts (i.e. Body Parts). The Body Patterns, Body Parts, and the data files they refer to are stored in Product Files.

In one embodiment, Body Patterns include: 1) Blueprint files (written in simple XML format), which are used to describe the structure of an object; 2) an indexed list of Body Parts; and 3) the asset names (3D, 2D, sound, etc.) used by each Body Part.

In one embodiment, Body Parts are the individual components of a Body Pattern. Body Parts have a proper name and an ID, defined in the Body Pattern.

In one embodiment, Product Files are compressed data files containing assets (3D data, 2D images, sound, animation, etc.), metadata (Body Pattern and Body Part information), and derivation information (product parentage). A single Product File may only refer to a single Body Pattern. However, a single Product File may include data for multiple Body Parts.

Using the data constructs described above, digital products and parts can be conveniently defined and their interconnection and interoperation can be self defining. Each Product File contains both the building materials (2D & 3D assets, sounds, animation, etc.) and the instructions for assembly (Body Patterns, Body Part definitions, etc.). Also, since a given product may require one or more other products to be present in order for it to function, Product Files also store information about which other products need to be loaded. Therefore, a Product File contains all the information required by the 3D Scene Builder 532, including references to other product-files from which a desired product may be derived. In this fashion, a hierarchical product definition is enabled.

The 3D scene builder 532 uses the chat command and control channel 526 as described above to receive a request for a particular identified product or part as encoded in 'star commands' which are interpreted by the 3D Scene Builder 532. The 3D Scene Builder 532 uses the products identified from channel 526 to obtain a corresponding Product File. If necessary, Product File download can be effected on channel 512 from product server 510. The Product file can then be used to render the desired product into the 3D scene displayed in the 3D window 532.

The 3D scene builder 532, manifested by the 3D window, 'manufactures' a 3D scene by displaying one or more 'products' as specified and identified by default configuration parameters and by explicit selection by IM users in star commands during a chat session. The 3D scene builder 532 takes the materials and instructions from the selected/identified Product Files, and assembles a 3D scene. The 3D, scene builder 532 is data-driven; it comprises a set of libraries and software application programs for displaying 2D and 3D content; but, 3D scene builder 532 contains no scene-specific information. The key concept here is that the 3D scene builder 532 is a powerful but data-barren construct.

Using the structures described above, the present invention enables a chat system having dual channel communications and self-defining product structures. In the examples presented below, these structures are used to support the various features of the present invention.

Figure 6:
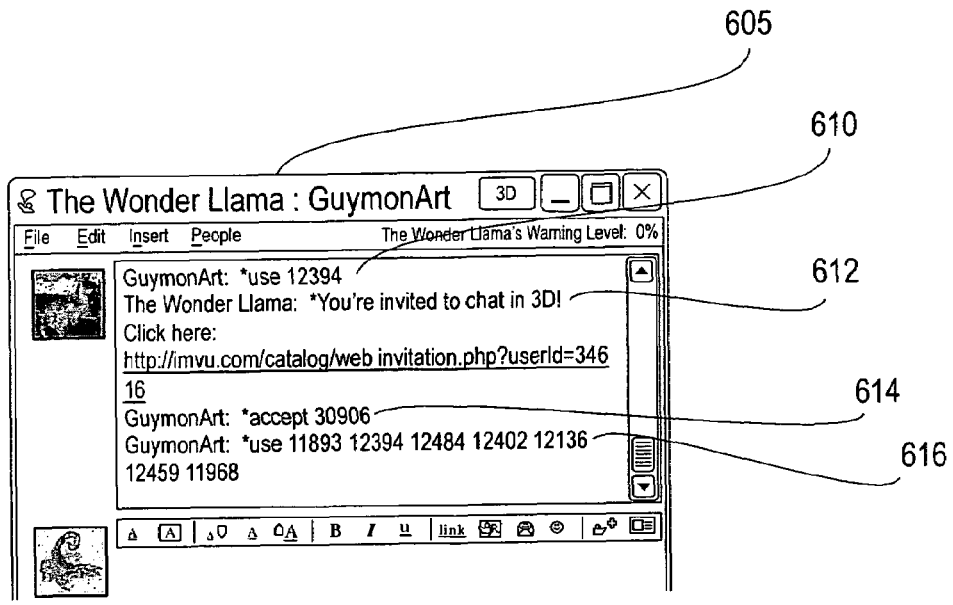
FIG. 6 illustrates an IMVU Session Start and Initial Product Loading.

FIG. 6 illustrates an IMVU Session Start and Initial Product Loading. Using well-known techniques, a text chat window 605 is displayed with the dialog between two IM users displayed as text strings. In this example, a first user (GuymonArt, User 1) is chatting with a second user (The Wonder Llama, User 2). In this example, text chat is sent via the IM. Authentication, versioning and product file download happen via the IMVU Client-Product Server Stream 512. Arbitrarily, User1 begins the chat and User2 responds. Initially, User 1 sends a star command, "*use 12394" to the IMVU client 710 as shown by the text string 610 illustrated in FIG. 6. The star command 610 is sent on the second logical channel 526 as described above. The command 610 identifies a product by its unique number. The unique product number corresponds to a product file that contains information about the product as also described above. In this manner, User1 and User2 IMVU Clients exchange star commands to describe the initial configuration for their respective avatar products (See FIG. 6, '*use 11893 12394 12484 . . . etc.') and for the 3D room in which the avatars-will be displayed. Also as shown in FIG. 6, User1 invites User2 into a 3D chat session by sending a star command (*You're Invited) 612 on the second logical channel 526. User2 IMVU Client responds with another star command (*accept) 614 to acknowledge the invitation from User1.

Figure 7:
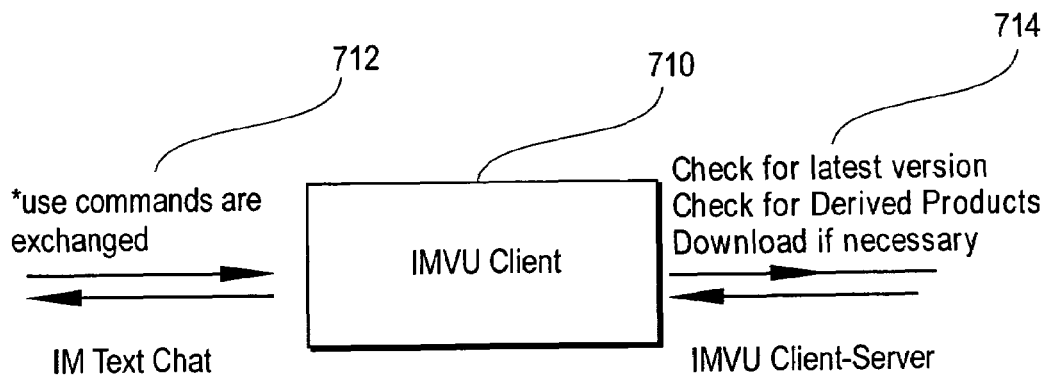
FIG. 7 illustrates a Product Usage Communication Pathway.

FIG. 7 illustrates a Product Usage Communication Pathway. As User1 and User2 IMVU Clients exchange star commands to describe the initial configuration for their respective avatar products (See FIG. 6, '*use 11893 12394 12484 . . . etc.') and to specify new avatar products (e.g. avatar clothing), the specified products are validated and obtained through a communication with Product Server 510. In this communication, User1 and User2 IMVU Clients query the Product Server 510 to verify that the latest version of each product file is present on the user's machine. If the product file is not resident on the user's machine, the product file is downloaded from the Product Server 510 (See FIG. 7). User1 and User2 also validate that the latest version of the specified products are resident on the user's machine.

Figure 8:
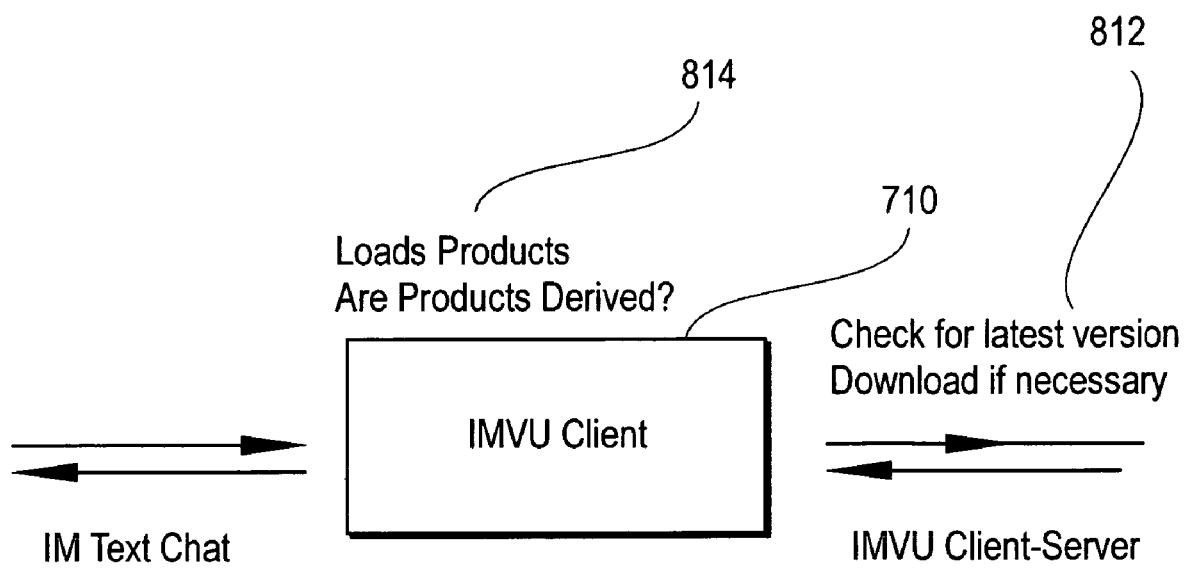
FIG. 8 illustrates a Derived Product Communication Loop.

FIG. 8 illustrates a Derived Product Communication Loop. As each product file is loaded into the requesting user's machine, the product file includes information that informs the IMVU Client whether the product is a derived product. For each derived product, the Product Server 510 validation-download cycle is repeated 814. See FIG. 8, i.e., does the latest version exist 812, if not fetch the latest version from the product server 510. Is the product a derived product 814, if so fetch the component parts of the derived product in the same manner as the product itself is fetched.

Figure 9:
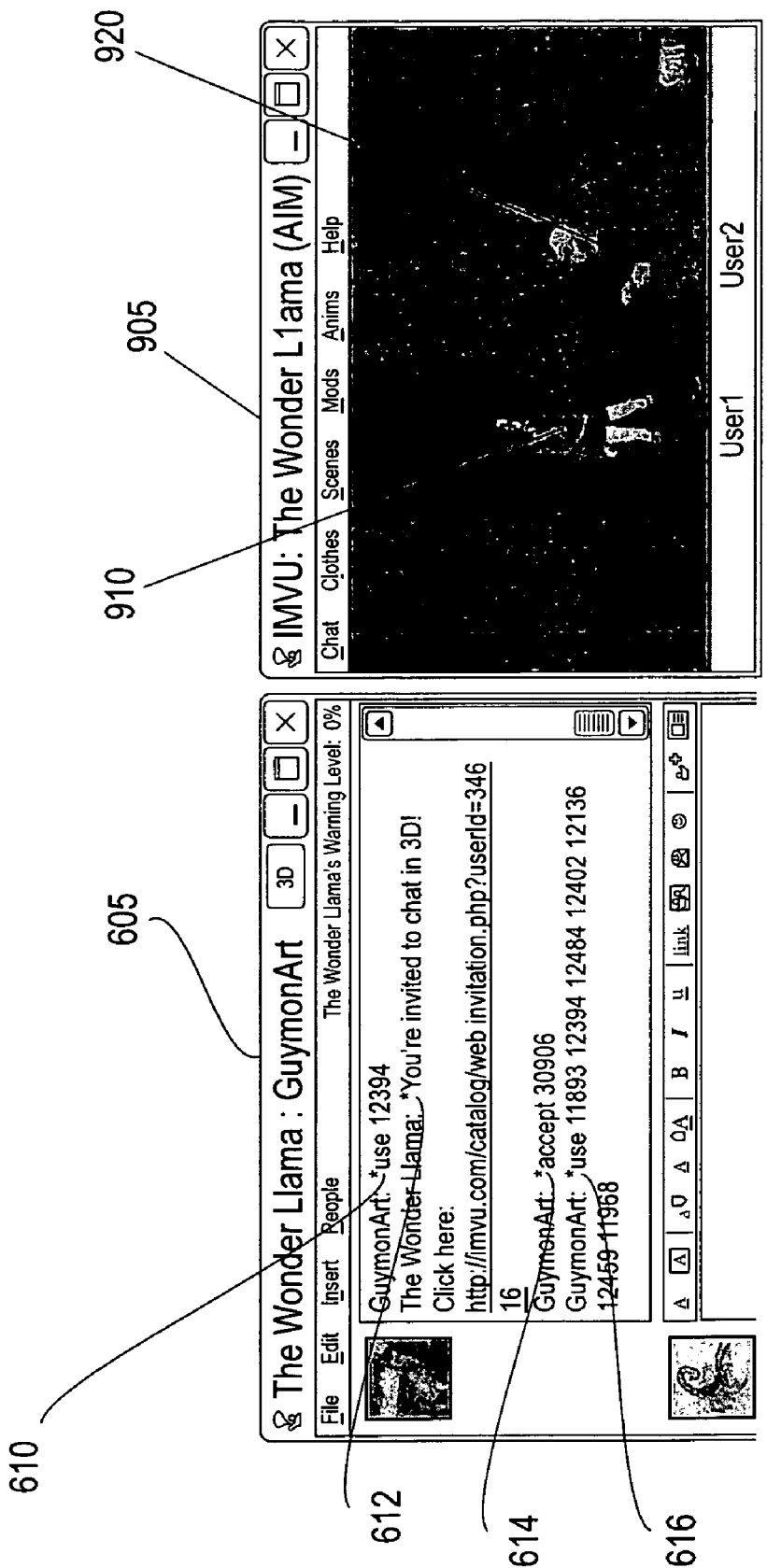
FIG. 9 illustrates Products Displayed in a 3D Window.

FIG. 9 illustrates Products Displayed in 3D Window. The Scene Builder 532 deploys the data contained in the accumulated product files to create a 3D scene 905. As shown in FIG. 9, the text chat window 605 is shown as in previous examples with the star command lines 610 and 616 (i.e. '*use 11893 12394 12484 . . . ' etc.). These "*use" commands specify the unique identity of avatar products that are displayed in 3D scene window 905. For example, the *use commands 610 and 616 are initiated by User1 to depict the avatar 910 corresponding to User1 in 3D scene 905 as wearing particular clothing. The particular clothing corresponds to the avatar products specified by User1 in the *use commands 610 and 616. In this manner, User1 has the ability to "dress" his/her avatar is a desired way. Similarly, User2 can use star commands to "dress" his/her avatar 920 in a desired way.

Figure 10:
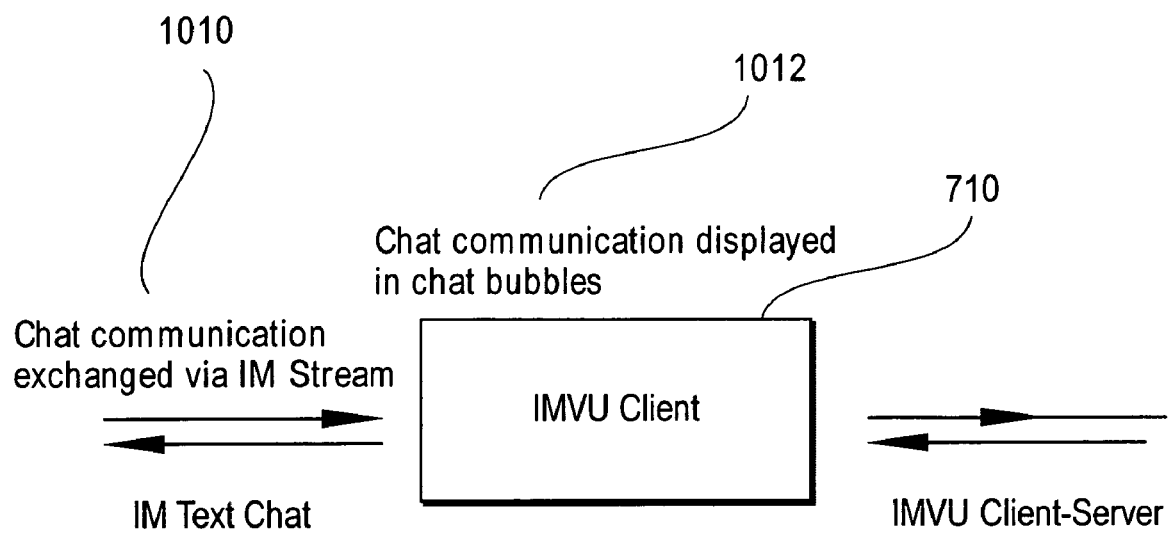
FIG. 10 illustrates a Simple Chat Communication Pathway.

FIG. 10 illustrates a Simple Chat Communication Pathway. Once the users in an IM chat session use the second logical channel commands 526 as described above to initiate a 3D scene and to "dress" their avatars in a desired fashion, the usual chat session can begin. Simple text chat communication is exchanged between User1 and User2 (FIG. 10 at 1010). Text chat on a first logical channel 524 is interpreted as simple chat and displayed as chat bubbles in the 3D scene 905 (FIG. 10 at 1012).

Figure 11:
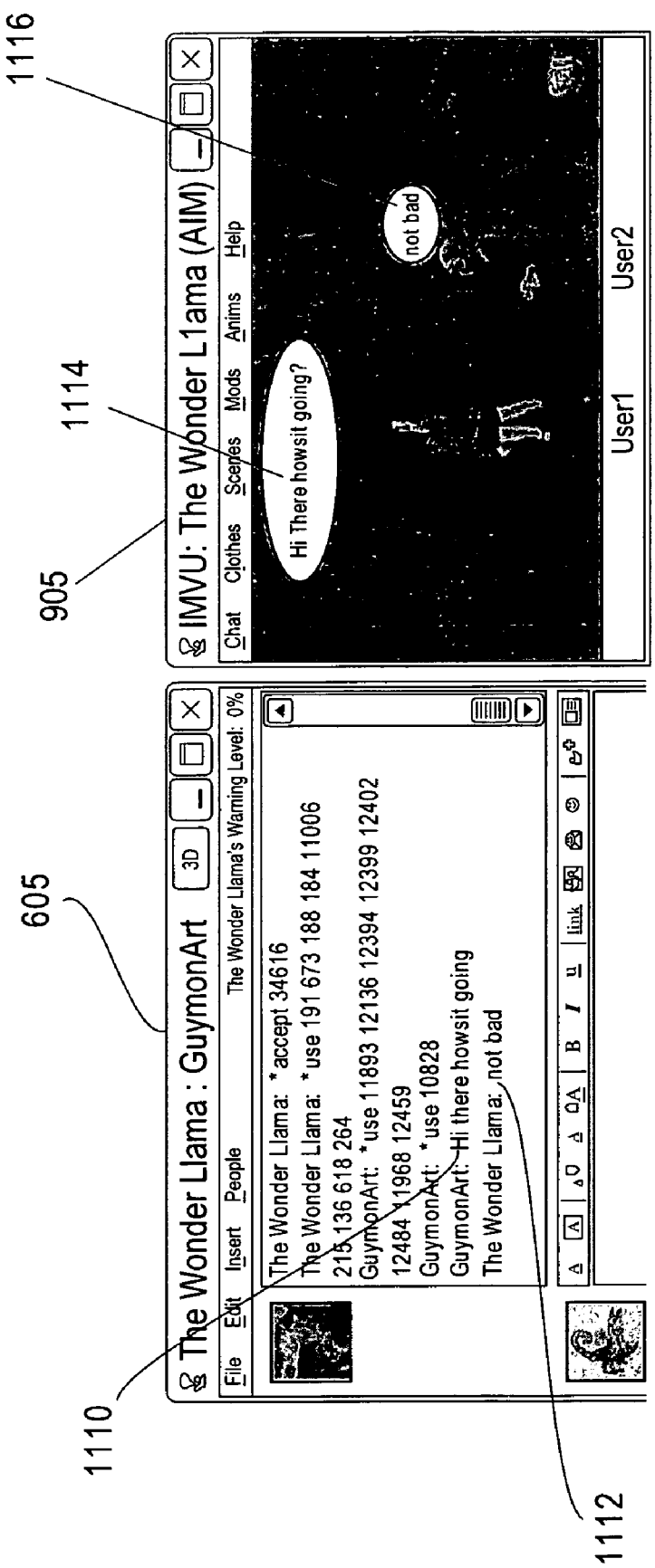
FIG. 11 illustrates Simple Chat Communication Displayed in a 3D Window with Chat Bubbles.

FIG. 11 illustrates a Simple Chat Communication Displayed in the 3D scene as chat bubbles. For example, the chat text input by User1 at chat stream 1110 is interpreted by IMVU client 710 and displayed in 3D scene 905 as chat bubble 1114. Similarly, the chat text input by User2 at chat stream 1112 is interpreted by IMVU client 710 and displayed in 3D scene 905 as chat bubble 1116.

Figure 12:
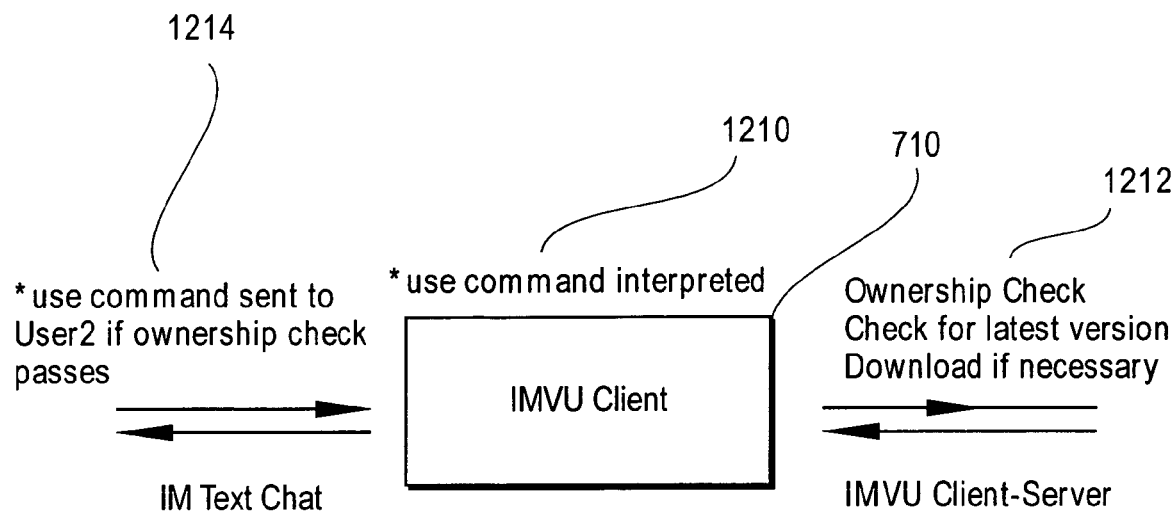
FIG. 12 illustrates a Product Usage Communication Pathway.
Figure 13:
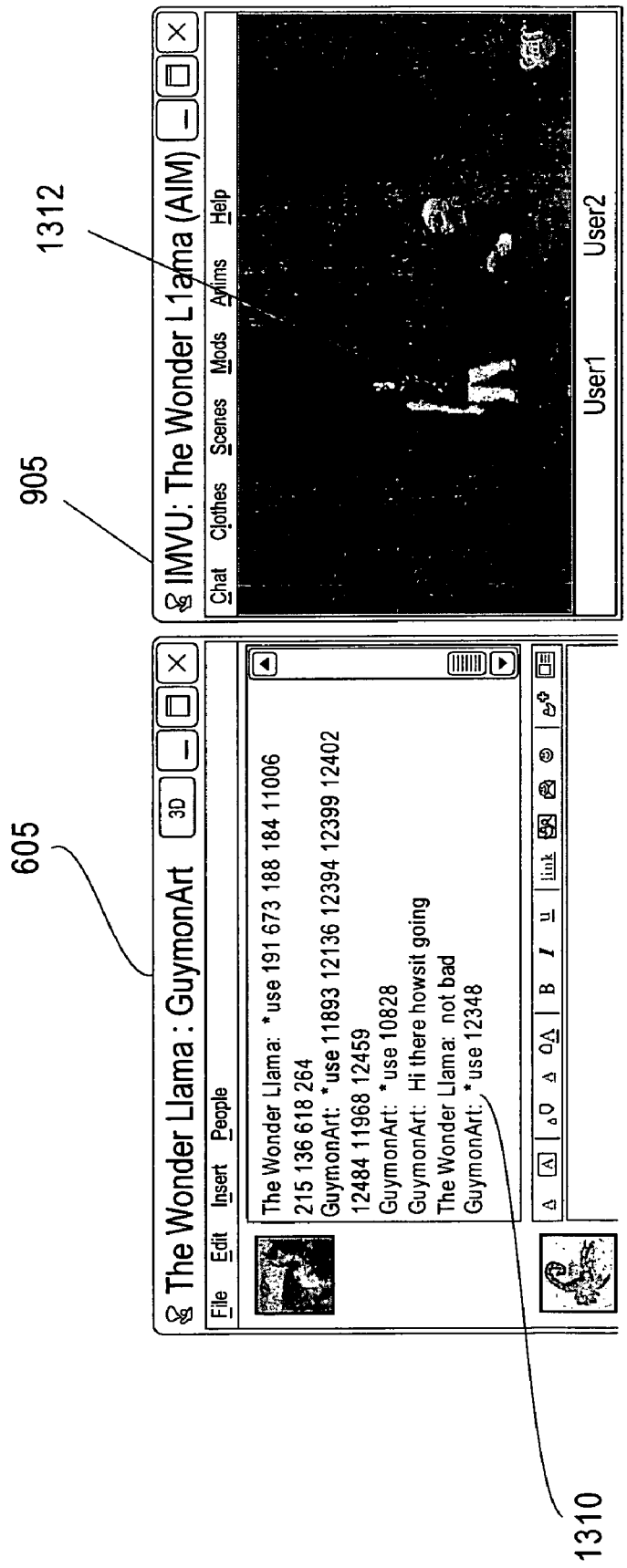
FIG. 13 illustrates a User Successfully Selecting and Displaying a Digital Product (e.g. Change of Clothing).

Referring now to FIGS. 12 and 13, an example of one embodiment illustrates how a user (User1 in this case) can employ star commands (i.e. the second logical channel commands 526) to modify the appearance of the avatar representing the user (User1 in this case) in the 3D scene 905.

FIG. 12 illustrates a Product Usage Communication Pathway. In step 1210, the IMVU client 710 interprets a "*use" command that specifies the selection of a particular avatar product. In this case, the User1 has entered a star command (see FIG. 13, command 1310) that specifies the selection of a particular avatar product that corresponds to a different set of clothing for the avatar 1312 corresponding to User1. In step 1212 shown in FIG. 12, the avatar product selected by User1 is validated in a communication between IMVU client 710 and product server 510. The ownership of the selected product is checked and the latest version information is obtained. If the selected product is not resident on the User1 computer system, the selected product is downloaded from product server 510 in step 1212. In step 1214, the *use command is sent to User2 if the ownership check passes. As a result, the new clothing corresponding to the selected and validated product specified by User1 is displayed on avatar 1312 in 3D scene window 905.

FIG. 13 illustrates a User Successfully Selecting and Displaying a Digital Product (e.g. Change of Clothing).

User1 changes clothes by typing a star command 1310 into the IM text window 605. This star command triggers the following events.

User1's IMVU client 710 interprets the star command (step 1210) and executes an ownership validation check via a communication 1212 with product server 510. In essence, the IMVU client 710 asks the product server 510, "does User1 own the specified product?" If 'yes', a version check is executed (step 1212), and the latest version, as well as any required products from which it is derived, are downloaded, as described above. Products are loaded into 3D Window 905 (see FIG. 13). In addition, the *use star command. is sent to User2. User2's IMVU Client 710 also executes a version check, and downloads products as necessary. These User2 products are also loaded into 3D Window 905 (see FIG. 13). If User1 does not own the specified product, no products are downloaded, and no star commands are sent to User2. In this manner, IM users can use the present invention to modify the look of their avatars and the 3D environment in 3D window 905.

Referring to FIGS. 14-22, the present invention enables users to make personal home pages using avatar pictures that the users can customize to represent themselves rather than using real world pictures. We call these web pages "avatar home pages." The avatar pictures of the present invention are graphical images of a character that the user has customized to represent himself/herself by combining body customization options and clothing options using, for example, the techniques described above. The avatar pictures can also be created illustrating the avatar in an environment, optionally interacting with other avatars in that environment so as to represent a social scene or activity. Again, a description of an embodiment of avatars interacting with other avatars in an environment is provided above. These avatar pictures enable users to create and express their online identities in their avatar home pages without revealing their physical appearance, thereby avoiding some of the risks of posting their real world pictures or identities on the internet and letting them exercise the freedom to fashion a fantasy identity for themselves that is not necessarily based on their real world appearance.

Figure 14:
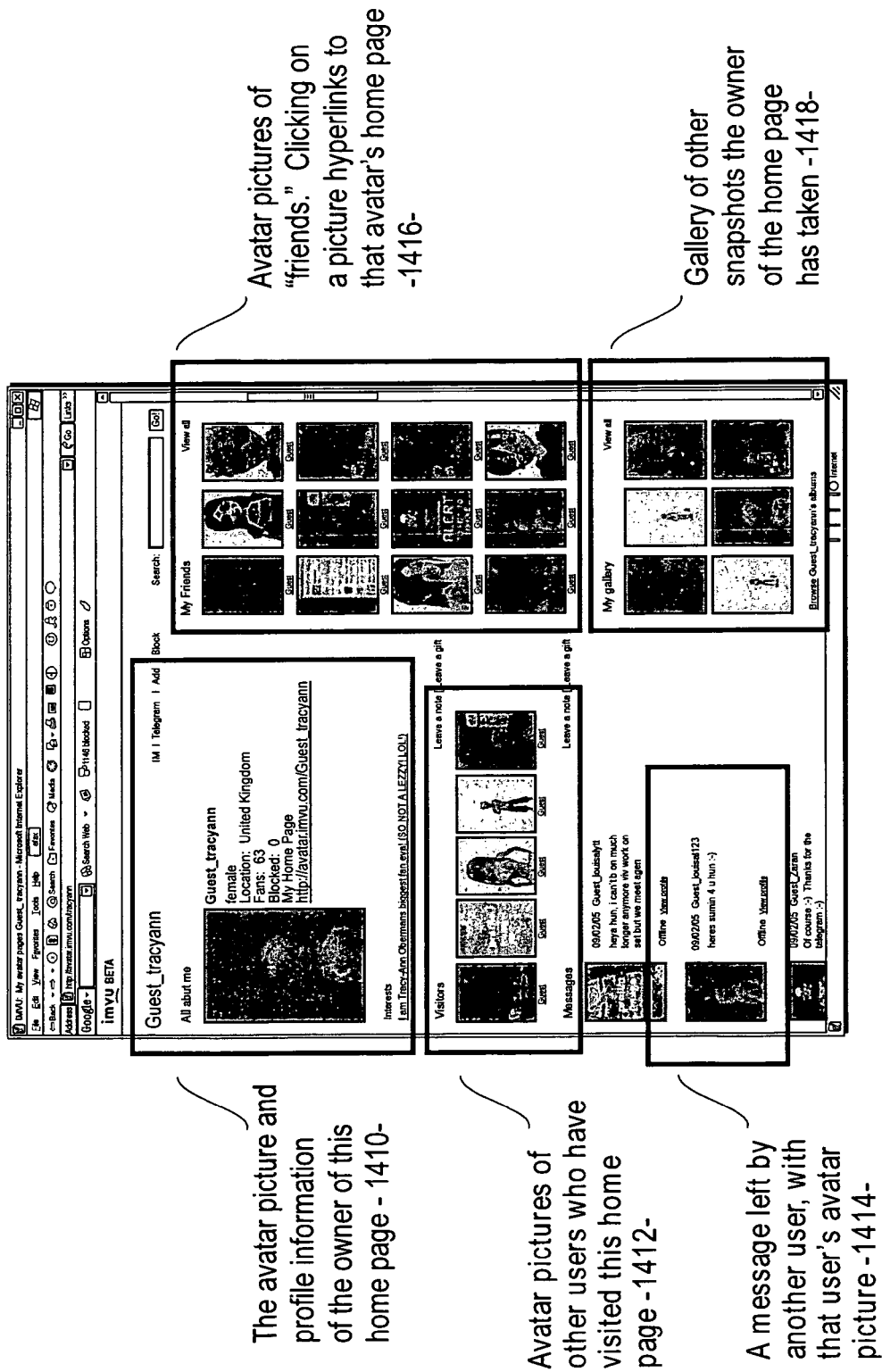
FIG. 14 is an example of an avatar home page created with one embodiment of the present invention.

Referring to FIG. 14, an example of an avatar home page created with one embodiment of the present invention is illustrated. Using conventional web page building tools, the present invention allows the creation of customized user home pages with avatars representing users in a unique manner. In one embodiment, the customized avatar webpage of the present invention is configured to include several blocks or components of information. In one block 1410, the user's profile information is displayed along with a representation of the avatar chosen by the user to represent herself/himself. The user's profile information can be captured in a variety of ways including direct entry by a user in a separate page. Avatar selection can be implemented by allowing the user to select from a set of available default or pre-configured avatars. In a second block 1412 of a first user's customized avatar homepage illustrated by example in FIG. 14, the first user's customized home page includes a set of avatars representing other users-who have visited the first user's homepage. The set of visitor avatars can be arranged in various sorted orderings including most recent to least recent, most often to least often, alphabetically, by gender, etc. The displayed visitor avatars can also be filtered in a variety of ways including displaying only those visitor avatars matching a pre-defined buddy list. In a third block 1414 of a first user's customized avatar homepage illustrated by example in FIG. 14, the first user's customized home page includes a set of messages left by other users for the first user. The messages include an avatar representation of the originator of the message. Again, these messages can be sorted and arranged in a variety of conventional ways. In a fourth block 1416 of a first user's customized avatar homepage illustrated by example in FIG. 14, the first user's customized home page includes a set of friends of the first user, each friend being represented by the avatar representing that friend. The list of friends can be explicitly pre-defined by the first user, automatically configured based on the frequency of contact with the first user, or defined in other ways. For each friend avatar displayed in the friend list 1416, the avatar can be activated, such as by clicking on the avatar with a pointing device, and such activation will cause the first user's computer software to hyperlink to the home page of the friend represented by the selected avatar. In this manner, the first user has a convenient way of quickly linking to his/her group of closest friends. In a fifth block 1418 of a first user's customized avatar homepage illustrated by example in FIG. 14, the first user's customized home page includes a gallery of snapshots the first user has taken. In other embodiments, the block 1418 can display or play other visual images, including pictures, images, video, animation, graphics, text, drawings, etc. associated with or of interest to the first user. Similarly, audio segments, music, sound effects, etc. or other audible items associated with or of interest to the first user can be included in gallery 1418. It will be apparent to those of ordinary skill in the art that other blocks of information or items of information associated with or of interest to the first user can be included with the customized avatar homepage illustrated by example in FIG. 14.

Figure 15:
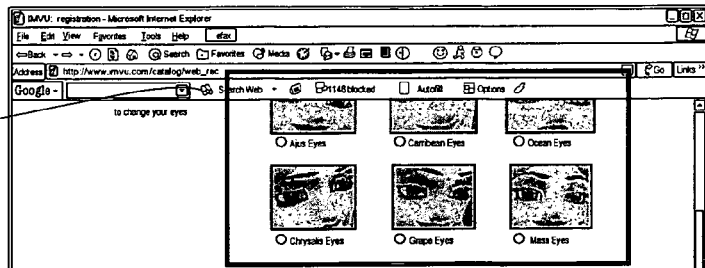
FIG. 15 is an example of avatar customization as shown in one embodiment of the present invention.
Figure 15:
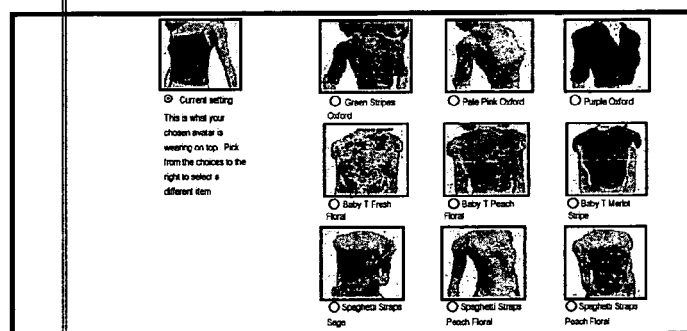
Figure 15:
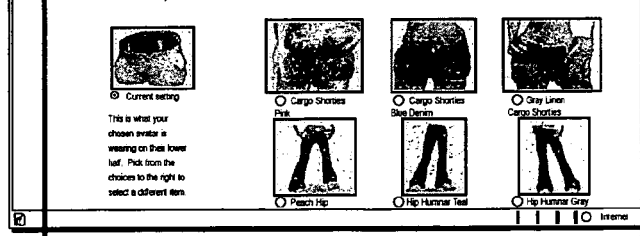

Referring to FIG. 15, an example of avatar customization in one embodiment of the present invention is illustrated. An important aspect of the present invention is that on-line users can anonymously represent themselves to other users with an avatar. It is another important aspect of the present invention that the avatar a user chooses to represent himself/herself can be uniquely customized to the user's taste.

One embodiment of the present invention includes a separate application with which the users customize a 3D avatar using 3D customization options such as clothing and body options. It will be apparent to those of ordinary skill in the art that a customization application in other embodiments of the present invention can be combined in a single application with others of the features described herein and not necessarily implemented as a separate application.

In support of this avatar customization feature of the present invention, the system and method of the present invention provides a capability to modify the appearance and/or structure of a selected avatar. FIG. 15 illustrates an embodiment of the avatar customization in an example. In this example, a user interface provides a means with which a user can customize the body and clothing of his/her avatar. For example, in interface segment 1510, the user can select from among a set of eye options. A selection option will cause the user's avatar to be modified to include the selected eye option. Similarly, the user can select from among a set of clothing tops (segment 1512) and/or a set of clothing bottoms (segment 1514). In each case, the selection of a particular option causes the system to apply the selected option to the user's avatar. In this manner, the user can customize her/his avatar to his/her own taste.

Figure 16:
FIG. 16 is an example of 3D avatar interaction in the same scene as shown in one embodiment of the present invention.
Figure 16:
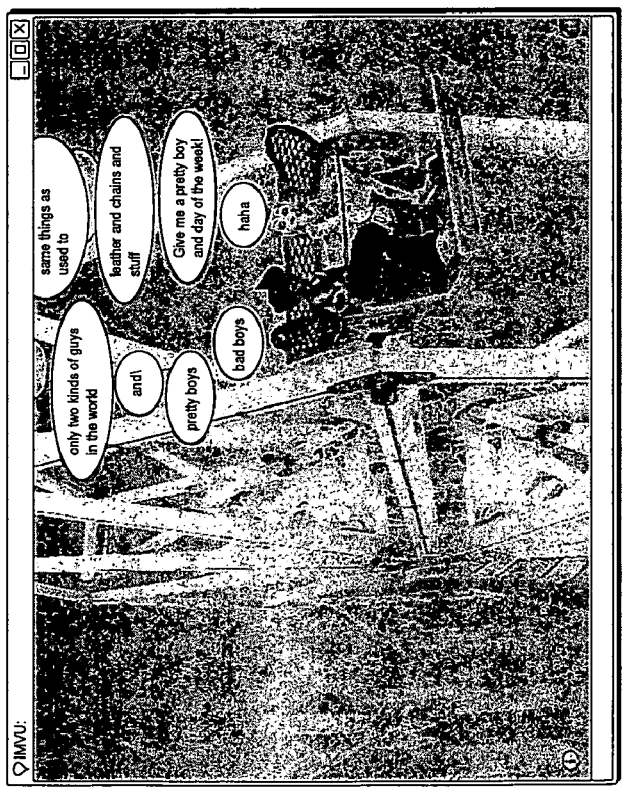

Referring to FIG. 16, an example of 3D avatar interaction in the same scene is shown in one embodiment of the present invention. As shown in scene example 1610, two 3D avatars are shown in a ferris wheel environment. The particular 3D scene in which avatars interact can be selected by the users or by the system. The avatars in example 1610 represent real on-line users engaged in a chat session. The chat text for each user is represented in chat bubbles above the avatar representing the speaking user. In another example of avatar interaction in the same scene is shown in example 1612. In this case, two avatars are interacting in a desert scene. The avatars in example 1612 are engaged in a dancing interaction made possible by the 3D avatar motion model of the present invention. A user can select a particular interaction sequence or action type and the system causes the user's avatars to engage in the selected activity or action. In this manner, two anonymous users can act out interactive behaviors through avatar interaction in a common selected scene. Such capabilities improve the level of communication and connection between on-line users.

Figure 17:
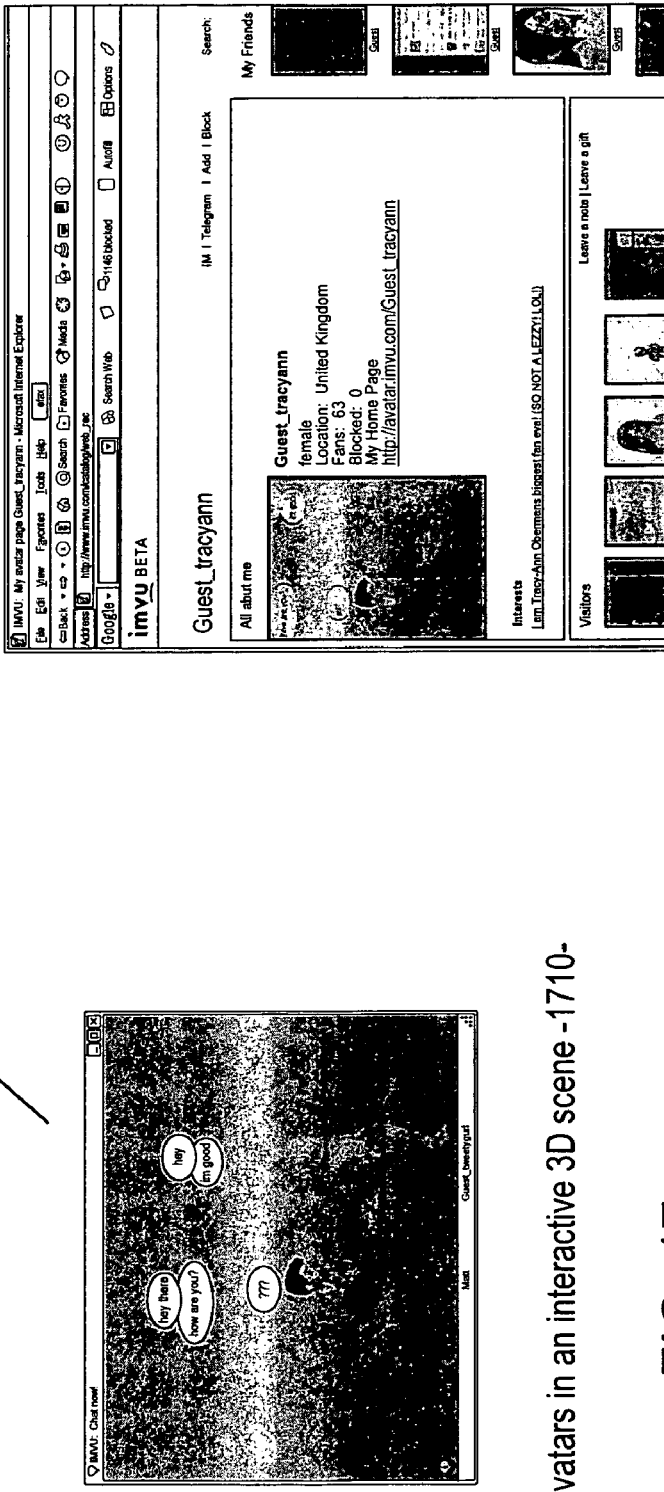
FIG. 17 is an example of one embodiment in which a user can take a 2D snapshot of a 3D avatar scene, upload the 2D image to a server, and display the 2D scene on a customized avatar homepage.

Referring to FIG. 17, an example illustrates one embodiment in which a user can take a 2D snapshot of a 3D avatar scene, upload the 2D image to a server, and display the 2D scene on a customized avatar homepage. One advantage of the present invention is that the avatars of the present invention are modeled in three dimensions. They are not simply static 2D images as initially created. As 3D avatars, users can manipulate the 3D avatars in various scenes and with various behaviors and actions as described above. Thus, the avatars can be customized and then manipulated with other avatars in a common scene. In this way, an unlimited quantity of user-driven interactions between 3D avatars can be realized. The system of the present invention then enables the users to take a 2D snapshot image of the avatar(s) in a 3D scene, optionally interacting with other avatars in the scene. The user may then upload the 2D snapshots to their avatar home pages. Again, because an unlimited quantity of user-driven interactions between 3D avatars can be realized, an unlimited quantity of user-driven 2D snapshots of avatars can be captured and uploaded to a user's home page. This allows a user to further customize his/her home page with avatar snapshots.

Referring again to FIG. 17, a user represented by a 3D avatar may be interacting with another user in a common 3D scene as described above (block 1710). The user activates a snapshot function using one of a variety of user input methods, such as a button activated with a mouse or pointing device. This is described in more detail below. Once the user activates the snapshot function, the system captures a 2D image of the 3D avatar scene using known 2D capture techniques. This captured 2D snapshot image is then uploaded (block 1712) to a home page customization and hosting server (block 1714). The home page server maintains the information used with the present invention to implement home page and avatar customization. At the user's command, the captured 2D snapshot can be shown as part of the user's customized home page (blocks 1716 and 1718). The captured 2D snapshot can also be transferred to other users for display on their customized home pages.

Figure 18:
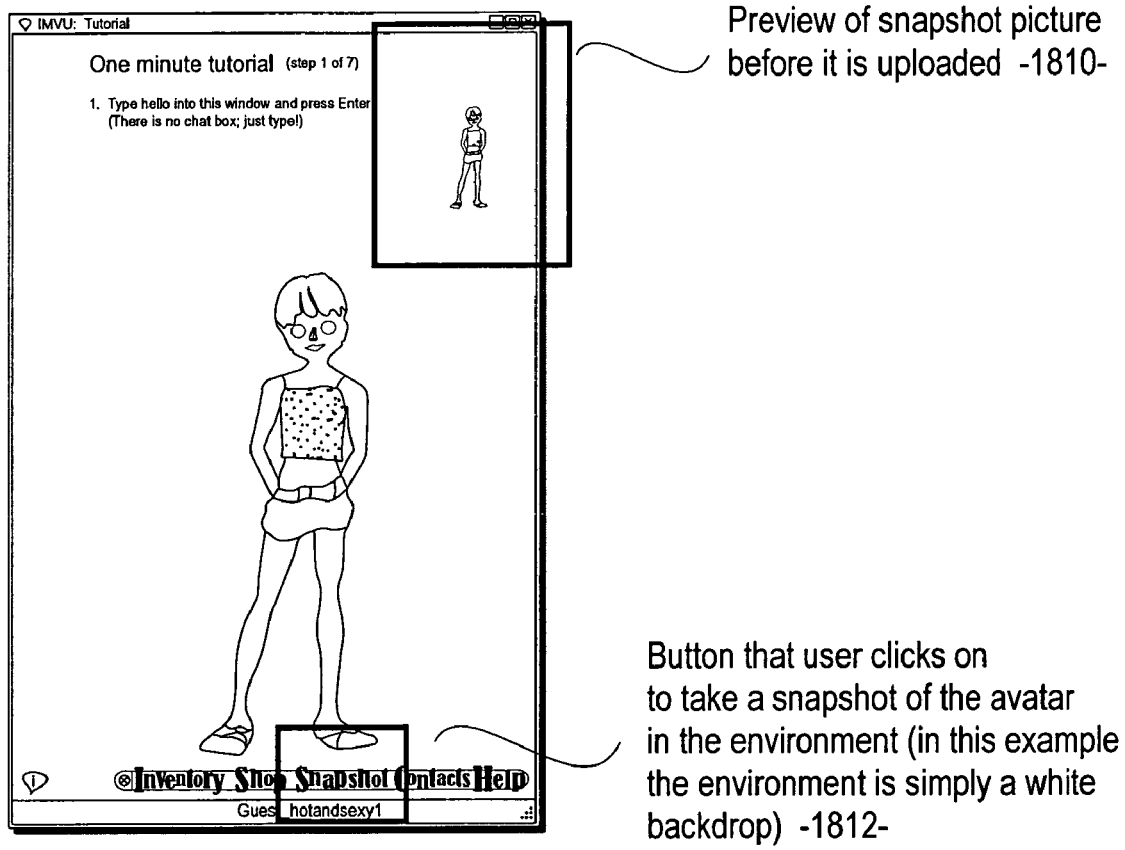
FIG. 18 is an example illustrating one embodiment in which a user can preview a snapshot and then activate a user input that causes the system to take a 2D snapshot of a 3D avatar scene.

Referring to FIG. 18, an example illustrates one embodiment in which a user can preview a snapshot and then activate a user input that causes the system to take a 2D snapshot of a 3D avatar scene. In this example, an avatar is shown in a 3D environment (in this case a white backdrop). One embodiment also shows user input (in this case a clickable button) 1812 the user may activate to cause the system to capture a 2D snapshot image of the 3D avatar. In this embodiment, a preview 1810 of the captured 2D image is displayed for the user prior to the uploading of the 2D snapshot to the home page server.

The creation of 2D images as snapshots taken of 3D avatars in a 3D scene provides a unique advantage over the technique of creating 2D avatar images directly out 2D customization elements: For example, snapshots taken of 3D avatars can show customized 3D avatars animating without requiring each customization option to have an independent screen image version for each possible pose of animation. Because users will typically want to animate their avatars in hundreds or thousands of poses, it just wouldn't be practical to create hundreds or thousands of images of each customization option as would be required using conventional techniques. For example, if one customization option were a shirt that the avatar could wear, it wouldn't be practical to create hundreds or thousands of images of that shirt taken from the different angles and with different body and arm positions that would be required to represent the avatar in the various animation poses that the user may want to show of the avatar in the scene. The creation of 2D images as snapshots taken from 3D avatars also enables the users to select the angle and position from which the snapshot is taken, thereby allowing the user the same kind of artistic flexibility that a photographer has when taking a conventional picture.

Referring again to FIG. 16, examples of 3D avatar interaction in the same scene (1610 and 1612) are shown in one embodiment of the present invention. The present invention's software application also includes features that allow users to interact using their 3D avatars through online activities such as communicating, shopping, or playing games. By enabling users to generate 2D images for their avatar home pages from the same 3D avatars that they use for other online activities, the present invention enables users to apply their same online identity (anonymous or not) across a variety of online activities. Each activity enhances the value of the online identity that the user is representing on the avatar home page. One particular embodiment of an interaction using 3D avatars is the communication feature that allows users to chat or instant message with each other in such a manner that each participant in the communication is represented by their avatar in the 3D scene, and in which their text messages are represented by chat bubbles above their avatars' heads as shown in the examples of FIG. 16. Another embodiment allows users to play online card games by showing the users' avatar sitting at a card table and enabling the users to control the animation of their avatars while playing the game.

In addition to the avatar home page and the online interactions directly supported by the present invention's software application, the application enables user to save 2D pictures taken of their 3D avatar to a local storage device so that users can import those pictures to represent themselves in other web services and applications provided by other companies that do not necessarily have a business relationship with the company providing the customized avatar home page service. Active internet users are often members in a plurality of special interest forums and chat communities, in which they are represented by a screen name and sometimes an icon or picture. The present invention's application makes it easy for the users to generate 2D pictures of their avatars to use in these separate online activities, and thereby further leverage the online identity that they are creating for themselves using the application and the avatar home page service.

Figure 20:
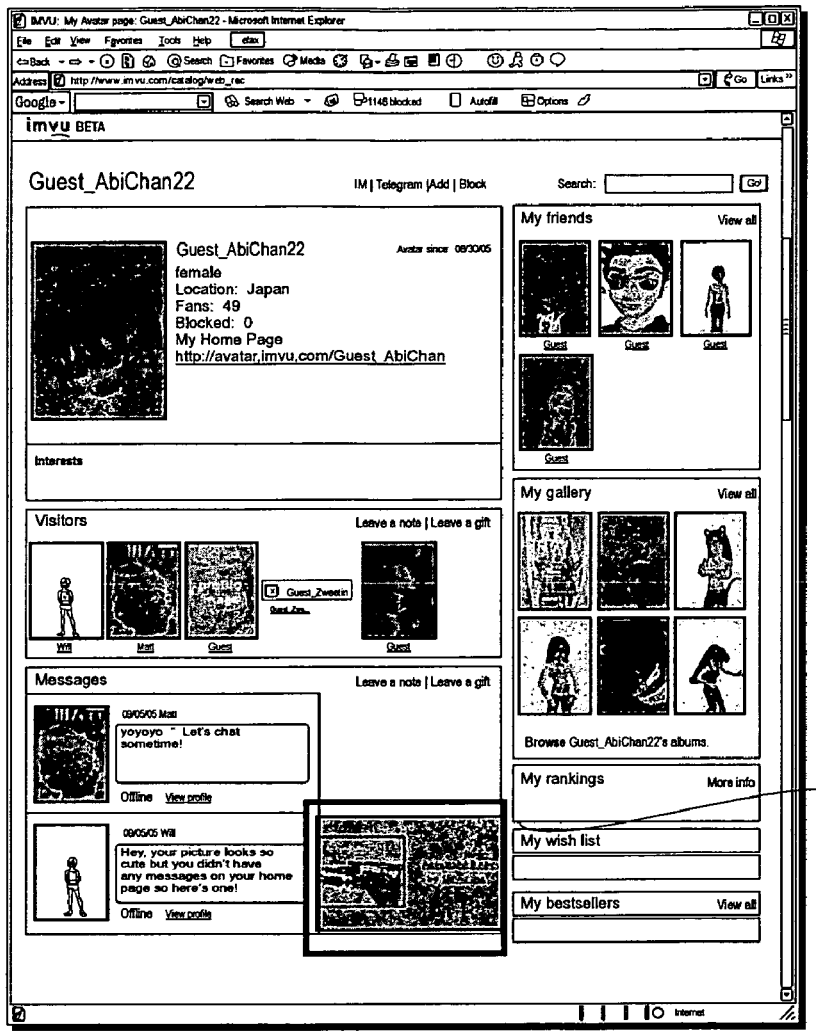
FIG. 20 is an example of an avatar home page including a message with an attached gift in one embodiment of the present invention.

Referring to FIG. 20, an example of an avatar home page including a message with an attached gift in one embodiment of the present invention is illustrated. The customized home pages of the present invention provide a convenient way of linking users to each other. For example, the friends list 1416, described in connection with FIG. 14, is one way in which users are conveniently (and anonymously) linked. The feature of the present invention whereby users may leave messages 1414 for each other on their home pages was also described above in connection with FIG. 14. As an extension of the functionality of the present invention, one embodiment also includes the capability for users to attach a gift to a message given to another user through the customized avatar home pages of the present invention. For example, a first user can compose a message to a second user and attach a gift to the message and send the message to the second user. The second user can open the message and retrieve the gift. The gift can be a digital object such as a document, picture, avatar customization object, coupon, ticket, 2D snapshot, 3D avatar interaction scene, or other digital object that might be considered of value or interesting to the second user. The second user can use her/his customized home page to retrieve the message and gift from the first user as shown in block 2010 of FIG. 20. In this manner, the present invention can support a form of e-commerce. The gifts given through the technique described above can be obtained from on-line stores or other on-line third parties who may be in the business of selling and/or distributing gifts that may be purchased, given, and received using the system and methods of the present invention.

Figure 21:
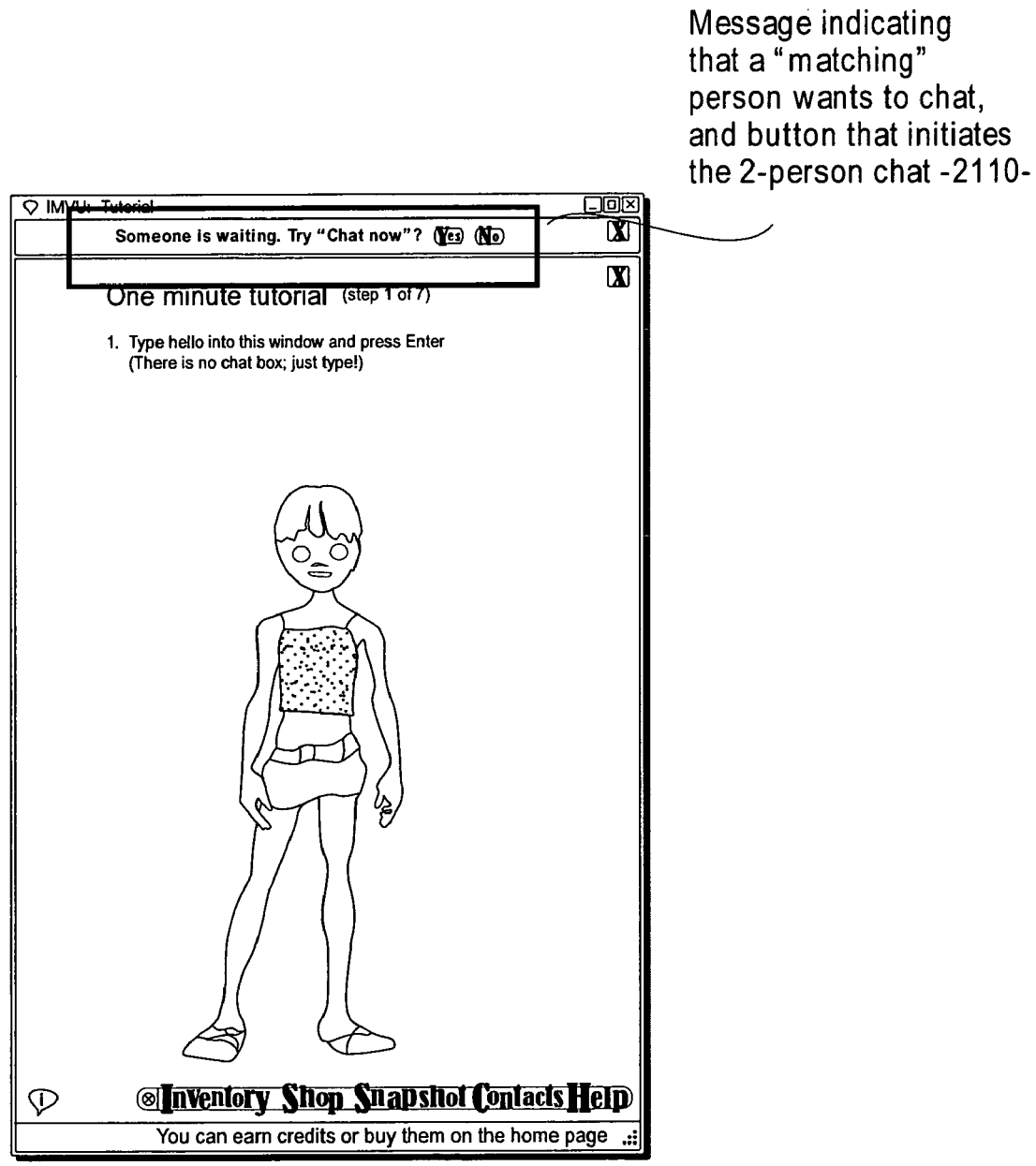
FIG. 21 is an example of an automatic matching and "Chat Now" feature in one embodiment of the present invention is illustrated.

Referring to FIG. 21, an example of an automatic matching and "Chat Now" feature in one embodiment of the present invention is illustrated. In one embodiment, the present invention includes a profile/comparison matching algorithm. This feature is used to match a person up with someone else who has similar interests and/or meets a minimum set of matching criteria. A user's pre-configured profile is used to compare particular characteristics to the profiles of other users. The customized home page server can be used as a centralized location for accomplishing this comparison. As a result of this comparison, the system generates a list of users who match certain criteria with the profile of a first user. The system can then determine which of the matched users are currently logged into the customized home page server. For these matching and currently logged in users, the system can present a prompt (2110 as shown in FIG. 21) that queries the first user to determine if the first user wishes to chat or communicate (i.e. Chat Now) with a matching user. Conversely, the system can present a prompt to the matching user(s) to query if the matching user wishes to chat or communicate with the first user. Each user is also presented with a user input or button that enables the user to enable the chat or communication with the other user. In this manner, the system can connect users in a communication based on a set of matching user profile criteria.

Figure 19:
FIG. 19 illustrates an example of the features of one embodiment for showing the geographical locations of users represented by their avatars.
Figure 22:
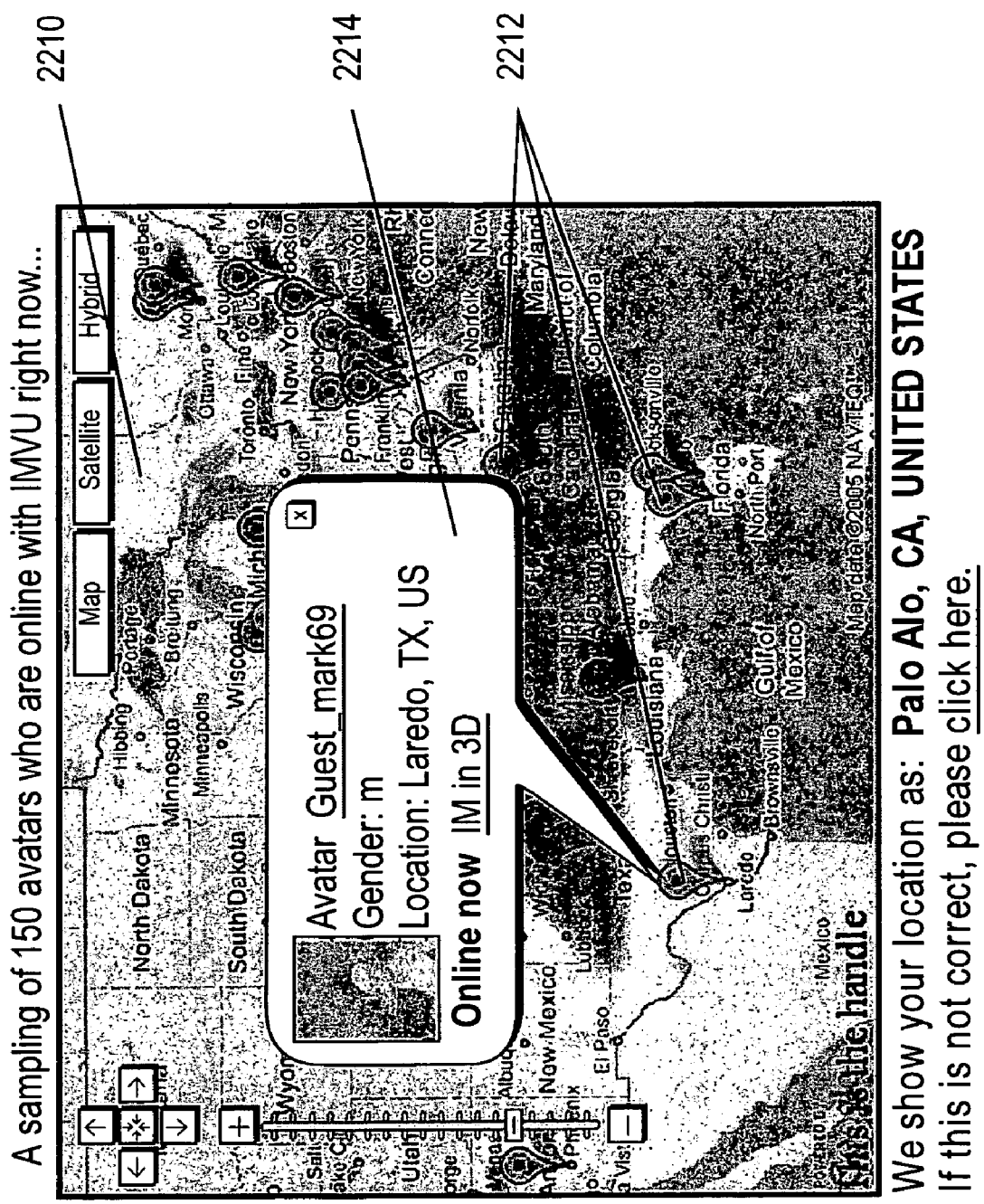
FIG. 22 illustrates an example of the features of one embodiment for showing the geographical locations of users represented by their avatars.

FIGS. 19 and 22 illustrate the features of the present invention for showing the geographical locations of users represented by their avatars. The system of the present invention maintains user profile information for each user. As described above, this profile information includes a customized avatar for each user. This user information may optionally include the geographical location of each user. Alternatively, the geographical location of a user can be automatically obtained using conventional data sources that correlate geographical location with an IP address (i.e. IP geo-coding) or other network information. In either case, a geographical location of each user can be obtained and retained in a system database. Conventional techniques also exist for plotting geographical positions on a 2D map on a computer screen. In one embodiment, using a combination of IP geo-coding and the well-known Google Maps API, we are able to represent user location information in the form of an interactive map 2210. An example is shown in FIG. 22. The system can map users to their location (longitute, latitude), using their IP address or other profile data. User locations are shown as pushpin symbols 2212 depicting the geographical location of each user on the interactive map 2210. Pushpin symbols 2212 are overlaid on the map, corresponding to the location of people in a relevant group. When these pushpin symbols 2212 are clicked, they provide social network-profile information about the user corresponding to the activated pushpin symbol 2212, such as the selected user's avatar name, avatar picture, gender, etc. The rendered information may also optionally include other information associated with the selected individual. The pushpin symbols 2212 also allow for taking actions, such as inviting the selected person to chat or viewing their public profile. The system can also display avatar profiles and pictures 2214, overlaid on the interactive (clickable, zoomable) map 2210. The system can also combine related sets of users (for example, recent visitors to a user's customized home page, or a user's social network connections, or a user's friend list, or other users geographically closest to a user, etc.) onto the interactive map 2210.

As shown in FIG. 19, the interactive map 1910 can be integrated into a user's customized home page. When the user activates a particular pushpin for a selected user, the selected user profile data 1912 is displayed as overlaid on the interactive map 1910.

The general idea here is to represent geographically interesting data about a person's participation in a social network. Most social network sites already provide some combination of data about groups of people, primarily "friends," "visitors," and "interest groups." However, this information is conventionally represented in text-only form. Using the techniques described herein, we are able to represent this social network information in the form of an interactive map.

Thus, a computer-implemented system and method for home page customization and e-commerce support is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

We claim:

1. An apparatus, comprising:
a customized avatar homepage generator configured to automatically generate at least one customized avatar homepage, the at least one customized avatar homepage including a first block to display a customized avatar representing a first user, the customized avatar being customizable with clothing options and body customization options selectable by the first user, the at least one customized avatar homepage including a second block to display at least one avatar representing a visitor to the at least one customized avatar homepage; and
a message processor to receive a message from a second user and to display in a third block of the at least one customized avatar homepage at least one avatar representing the second user from whom the message was received.

2. The apparatus as claimed in claim 1 wherein the clothing options include selectable 3D clothing options.

3. The apparatus as claimed in claim 1 wherein the body customization options include selectable body pattern options.

4. The apparatus as claimed in claim 1 wherein the first block, the second block, and the third block are displayed on the same webpage.

5. The apparatus as claimed in claim 1 wherein the message processor includes an instant messaging apparatus to allow the first user to instant message other users in a visual environment and to display the first user and the other users as 3D avatars, each of which represent one of the users participating in the instant messaging.

6. The apparatus as claimed in claim 1 including a 3D avatar motion model to enable the first user to interact in a common scene with the second user wherein the customized avatar representing the first user and the avatar representing the second user are displayed in a common scene and may interact with each other.

7. The apparatus as claimed in claim 6 further including an image recorder to allow users to record screen images (snapshots) taken of the common scene, and to upload the screen images to the customized avatar homepage generator as an image that may represent a user on a customized avatar homepage.

8. The apparatus as claimed in claim 7 wherein the image recorder enables the first user to save an image of the customized avatar representing the first user to a storage medium in a form that can uploaded to other web services or applications.

9. The apparatus as claimed in claim 1 wherein the customized avatar homepage generator displays the real world geographical location of a user.

10. The apparatus as claimed in claim 1 wherein the customized avatar homepage generator enables the first user to designate other users as friends, the customized avatar homepage generator displaying an avatar representing at least one friend in a fourth block of the at least one customized avatar homepage.

11. The apparatus as claimed in claim 10 wherein the customized avatar homepage generator being further configured to display the avatar representing at least one friend with a real world geographical location of the at least one friend by showing a marker on a visual map displayed on the customized avatar homepage.

12. The apparatus as claimed in claim 1 wherein the message processor being further configured to enable users to post messages on other users' homepages.

13. The apparatus as claimed in claim 1 wherein the message processor being further configured to visually identify senders of messages by showing pictures of avatars representing the message senders in combination with other message sender information.

14. The apparatus as claimed in claim 1 wherein the message can be private or public, such that a private message is visible on a receiver's customized avatar homepage only by a receiver.

15. The apparatus as claimed in claim 1 being further configured to receive a gift with the message from the second user.

16. The apparatus as claimed in claim 15 wherein the gift is a 3D clothing option or body customization option that the first user can use to further customize the customized avatar representing the first user.

17. The apparatus as claimed in claim 15 wherein the gift is a decoration object that the first user can use to further customize the customized avatar representing the first user.

18. The apparatus as claimed in claim 17 wherein the decoration object includes a screen image that the first user can position on the customized avatar homepage.

19. The apparatus as claimed in claim 17 wherein the decoration object has a limited duration lifetime after which the decoration object is automatically removed from the customized avatar homepage.

20. A method, comprising:
   automatically generating at least one customized avatar homepage, the at least one customized avatar homepage including a first block to display a customized avatar representing a first user, the customized avatar being customizable with clothing options and body customization options selectable by the first user, the at least one customized avatar homepage including a second block to display at least one avatar representing a visitor to the at least one customized avatar homepage; and
   receiving a message from a second user and to display in a third block of the at least one customized avatar homepage at least one avatar representing the second user from whom the message was received.

21. The method as claimed in claim 20 wherein the clothing options include selectable 3D clothing options.

22. The method as claimed in claim 20 wherein the body customization options include selectable body pattern options.

23. The method as claimed in claim 20 wherein the first block, the second block, and the third block are displayed on the same webpage.

24. The method as claimed in claim 20 including allowing the first user to instant message other users in a visual environment and to display the first user and the other users as 3D avatars, each of which represent one of the users participating in the instant messaging.

25. The method as claimed in claim 20 including enabling the first user to interact in a common scene with the second user wherein the customized avatar representing the first user and the avatar representing the second user are displayed in a common scene and may interact with each other.

26. The method as claimed in claim 25 including allowing users to record screen images (snapshots) taken of the common scene, and to upload the screen images for customization of the customized avatar homepage.

27. The method as claimed in claim 20 including enabling the first user to save an image of the customized avatar representing the first user to a storage medium in a form that can uploaded to other web services or applications.

28. The method as claimed in claim 20 including displaying the real world geographical location of a user.

29. The method as claimed in claim 20 including enabling the first user to designate other users as friends, and displaying an avatar representing at least one friend in a fourth block of the at least one customized avatar homepage.

30. The method as claimed in claim 29 including displaying the avatar representing at least one friend with a real world geographical location of the at least one friend by showing a marker on a visual map displayed on the customized avatar homepage.

31. The method as claimed in claim 20 including enabling users to post messages on other users' homepages.

32. The method as claimed in claim 20 including showing an image of an avatar representing a message sender in combination with other message sender information.

33. The method as claimed in claim 20 wherein the message can be private or public, such that a private message is visible on a receiver's customized avatar homepage only by a receiver.

34. The method as claimed in claim 20 including receiving a gift along with the message from the second user.

35. The method as claimed in claim 34 wherein the gift is a 3D clothing option or body customization option that the first user can use to further customize the customized avatar representing the first user.

36. The method as claimed in claim 34 wherein the gift is a decoration object that the first user can use to further customize the customized avatar representing the first user.

37. The method as claimed in claim 36 wherein the decoration object contains a screen image that the first user can use to further customize the customized avatar representing the first user.

38. The method as claimed in claim 36 wherein the decoration object has a limited duration lifetime after which the decoration object is automatically removed from the customized avatar homepage.

* * * * *